US010905529B2

United States Patent
Haydar

(10) Patent No.: US 10,905,529 B2
(45) Date of Patent: Feb. 2, 2021

(54) OVAL SECTION DENTAL IMPLANT

(71) Applicant: Imad Haydar, Damascus (SY)

(72) Inventor: Imad Haydar, Damascus (SY)

(73) Assignee: Imad Haydar, Damascus (SY)

( * ) Notice: Subject to any disclaimer, the term of this patent is extended or adjusted under 35 U.S.C. 154(b) by 99 days.

(21) Appl. No.: 15/140,995

(22) Filed: Apr. 28, 2016

(65) Prior Publication Data
US 2016/0235503 A1 Aug. 18, 2016

Related U.S. Application Data

(63) Continuation-in-part of application No. 14/125,607, filed as application No. PCT/SY2011/000002 on Jun. 22, 2011.

(30) Foreign Application Priority Data

Jun. 13, 2011 (SY) .................. 2011060140

(51) Int. Cl.
*A61C 8/00* (2006.01)
*A61C 1/08* (2006.01)

(52) U.S. Cl.
CPC ............ *A61C 8/0037* (2013.01); *A61C 1/084* (2013.01); *A61C 8/0001* (2013.01); *A61C 8/008* (2013.01); *A61C 8/0019* (2013.01); *A61C 8/0054* (2013.01); *A61C 8/0068* (2013.01); *A61C 8/0069* (2013.01); *A61C 8/0087* (2013.01); *A61C 8/0089* (2013.01)

(58) Field of Classification Search
CPC ... A61C 8/0018; A61C 8/0019; A61C 8/0034; A61C 8/0036; A61C 8/0037; A61C 8/00; A61C 8/0098
See application file for complete search history.

(56) References Cited

U.S. PATENT DOCUMENTS

| | | | |
|---|---|---|---|
| 5,088,926 A * | 2/1992 | Lang .................... | A61C 8/0022 433/173 |
| 6,039,568 A | 3/2000 | Hinds | |
| 2008/0227057 A1 | 9/2008 | Anitua Aldecoa | |
| 2009/0092944 A1 * | 4/2009 | Pirker .................. | A61C 8/0036 433/173 |
| 2009/0142732 A1 * | 6/2009 | Kahdemann ......... | A61C 8/0069 433/174 |
| 2012/0251977 A1 * | 10/2012 | Vercellotti et al. .. | A61C 8/0019 433/174 |

FOREIGN PATENT DOCUMENTS

| | | | |
|---|---|---|---|
| DE | 10259942 | * | 7/2004 |
| DE | 202010013168 U1 | * | 3/2011 |

OTHER PUBLICATIONS

Machine Translation of DE202010013168 U1. Accessed at EPO website on Jun. 19, 2018.*
Machine Translation of DE 10259942 accessed at EPO website Oct. 29, 2020 (Year: 2020).*

* cited by examiner

*Primary Examiner* — Edward Moran

(57) ABSTRACT

The invention is directed to a new dental implant and associated parts that allow for insertion in narrow areas of the alveolar bone. Characteristics of the body of the implant allow for comfortable insertion in narrow bone clefts provided by its smooth narrow sections. The implant provides an alternative to complex and time consuming surgical processes involving bone regeneration and/or grafting.

7 Claims, 21 Drawing Sheets

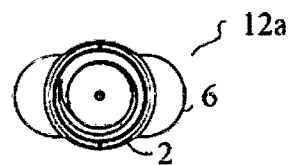
FIG.1A1
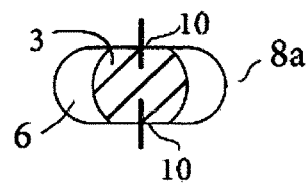
FIG.1A3
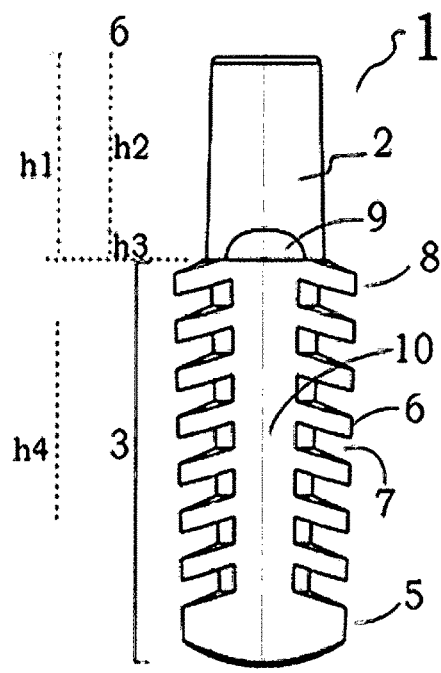
FIG.1A
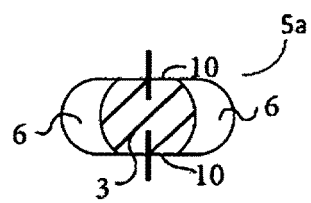
FIG.1A4
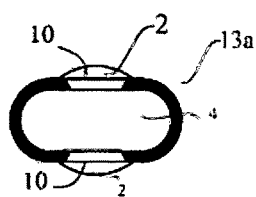
FIG.1A2

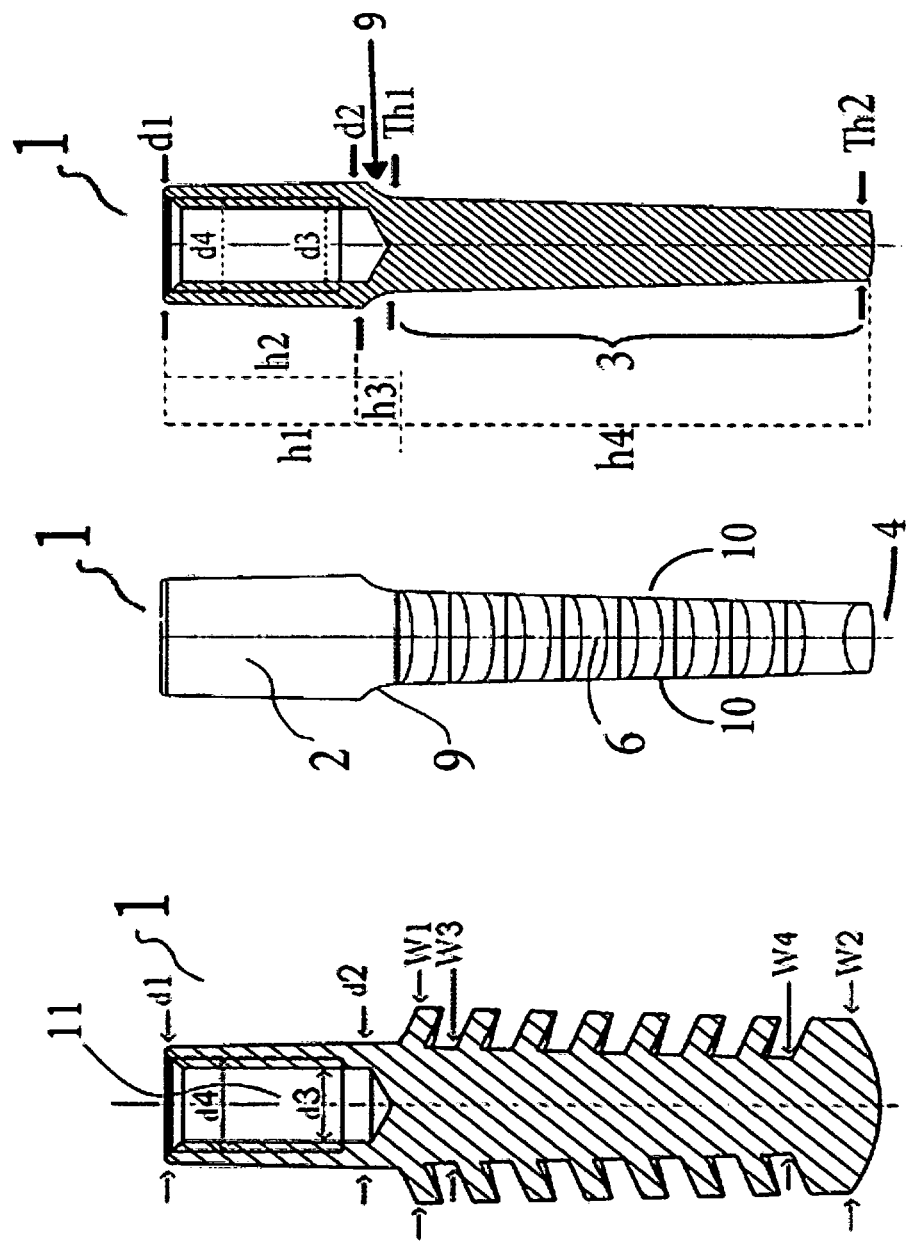

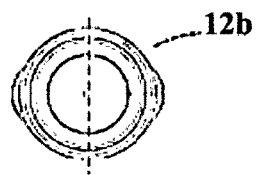
FIG.3A1
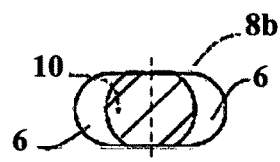
FIG.3A3
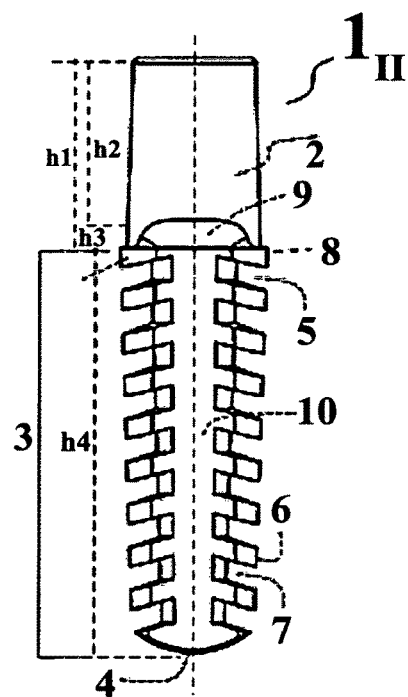
FIG.3A
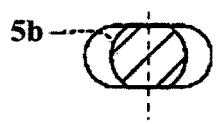
FIG.3A4
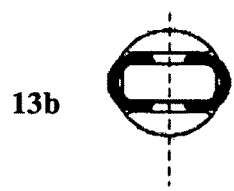
FIG.3A2

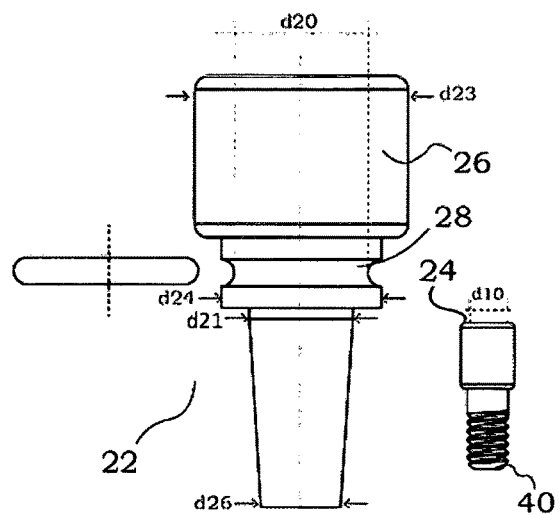
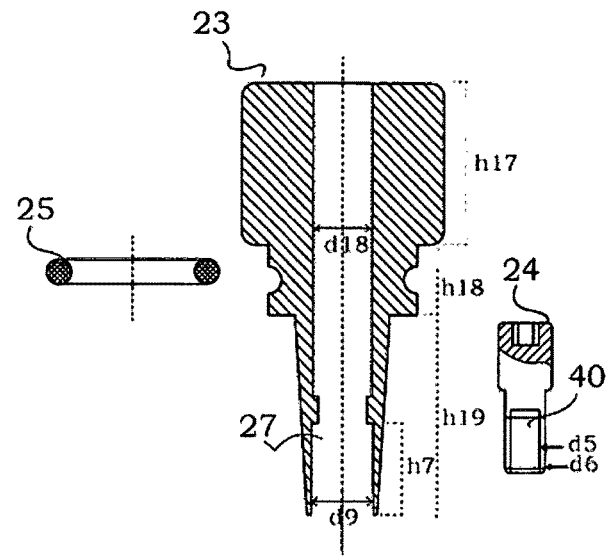
FIG.5                    FIG.6
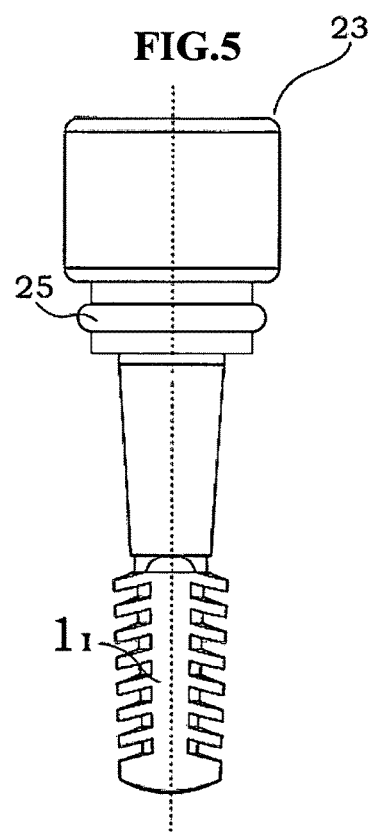
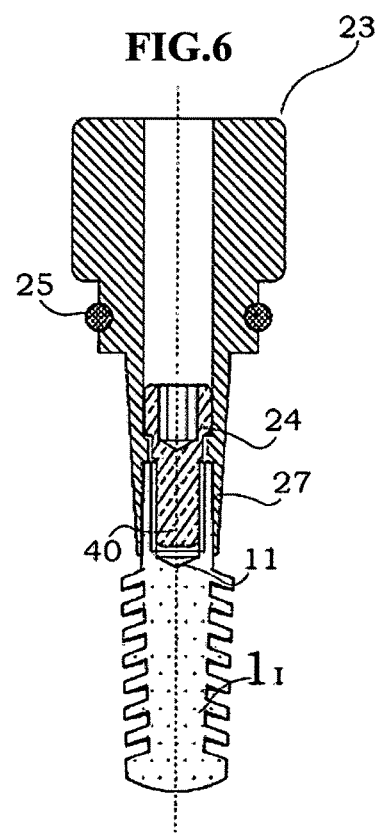
FIG.7A                   FIG.7B

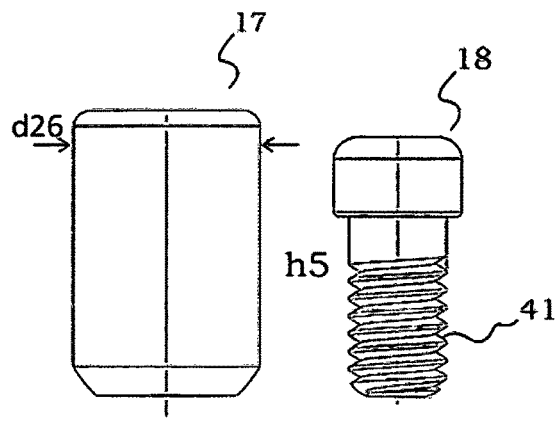
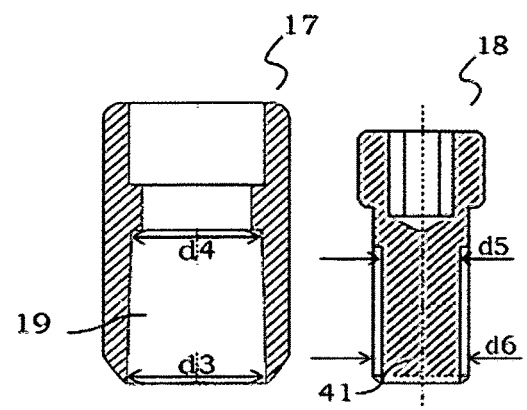
FIG.8  FIG.9
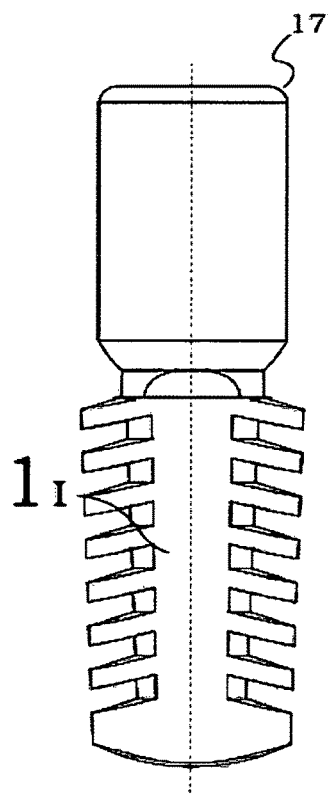
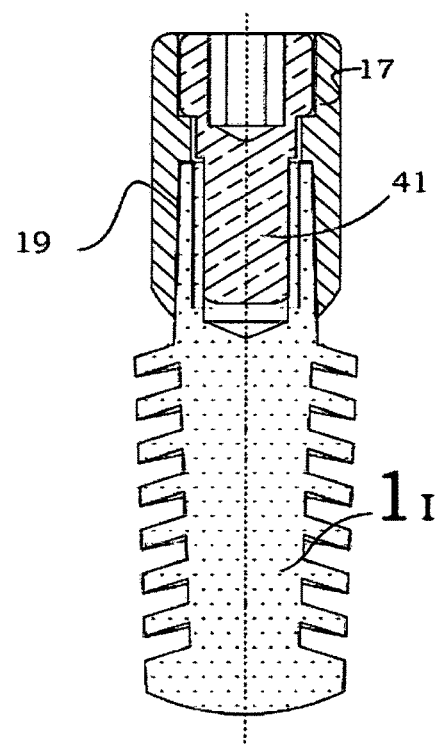
FIG.10A  FIG.10B

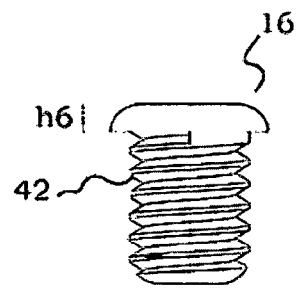 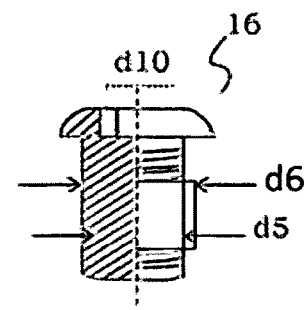
FIG.11A  FIG.11B
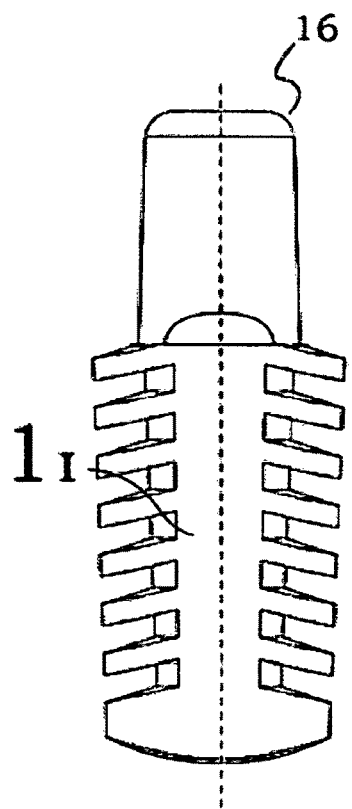 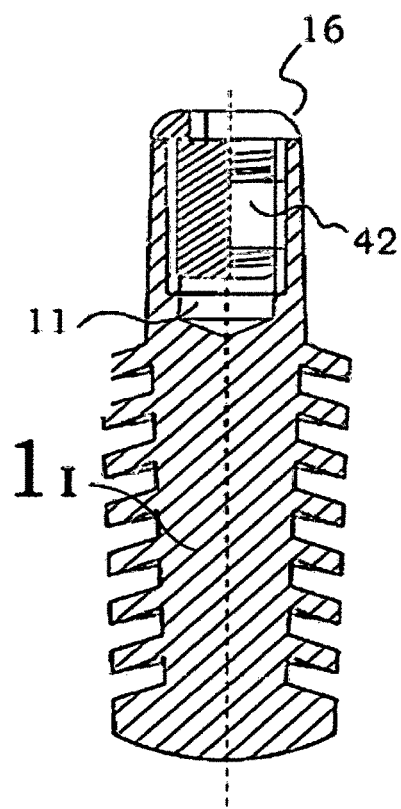
FIG.12A  FIG.12B

FIG.25C
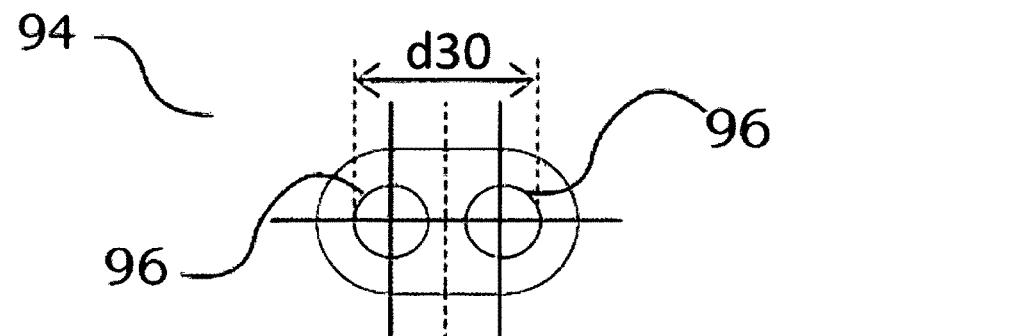
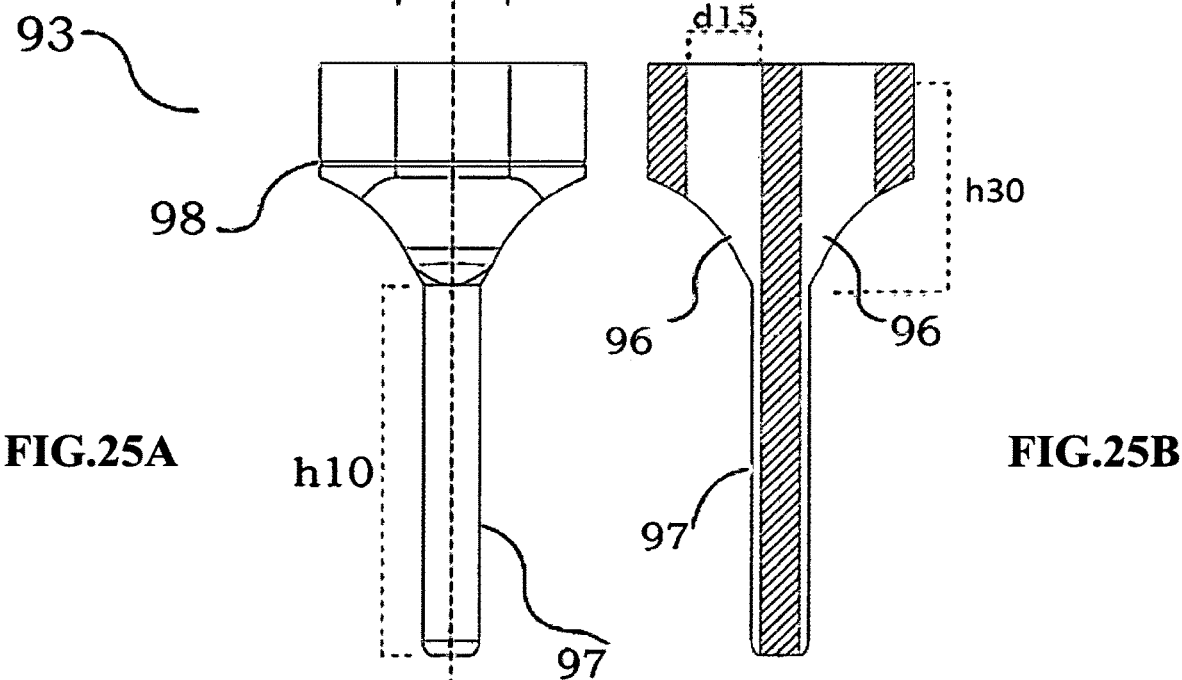
FIG.25A  FIG.25B
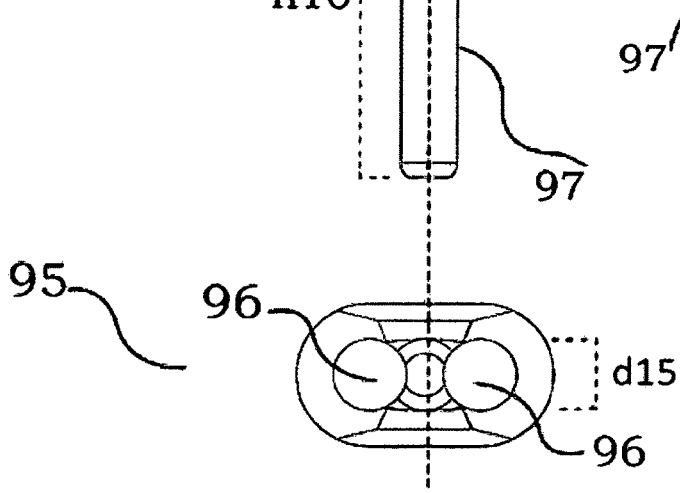
FIG.25D

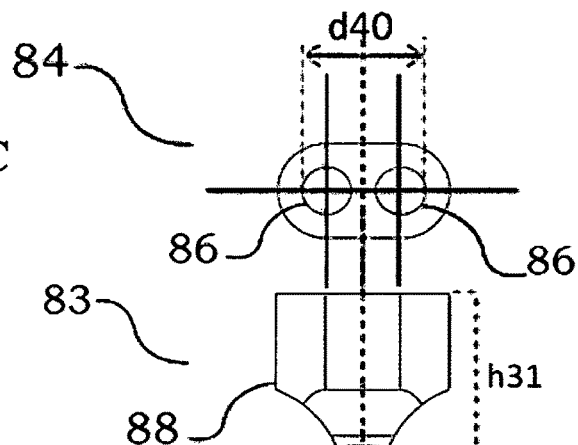
FIG.26C
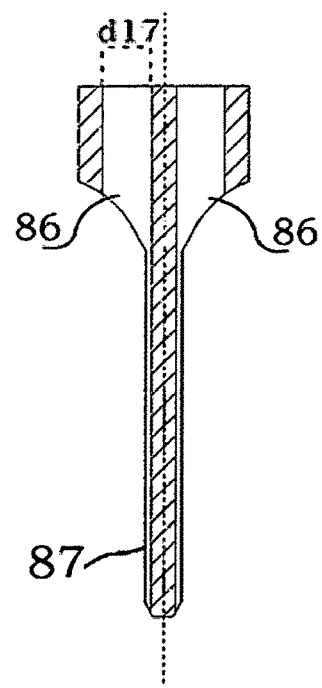
FIG.26B
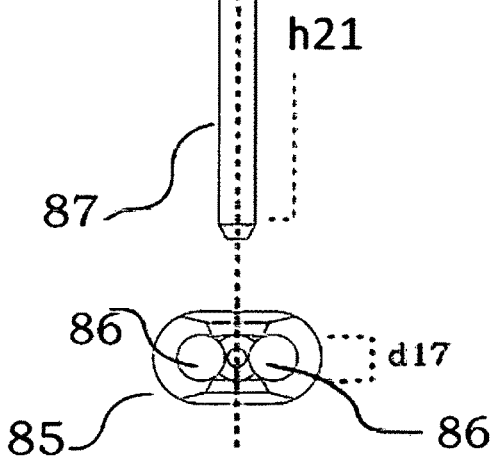
FIG.26A
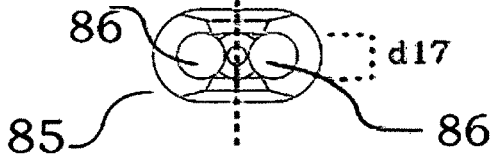
FIG.26D
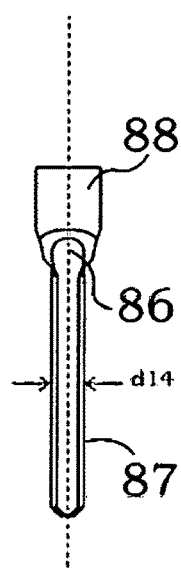
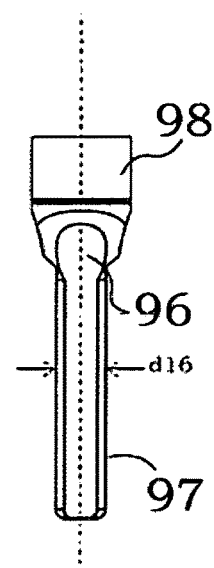
FIG.27A  FIG.27B

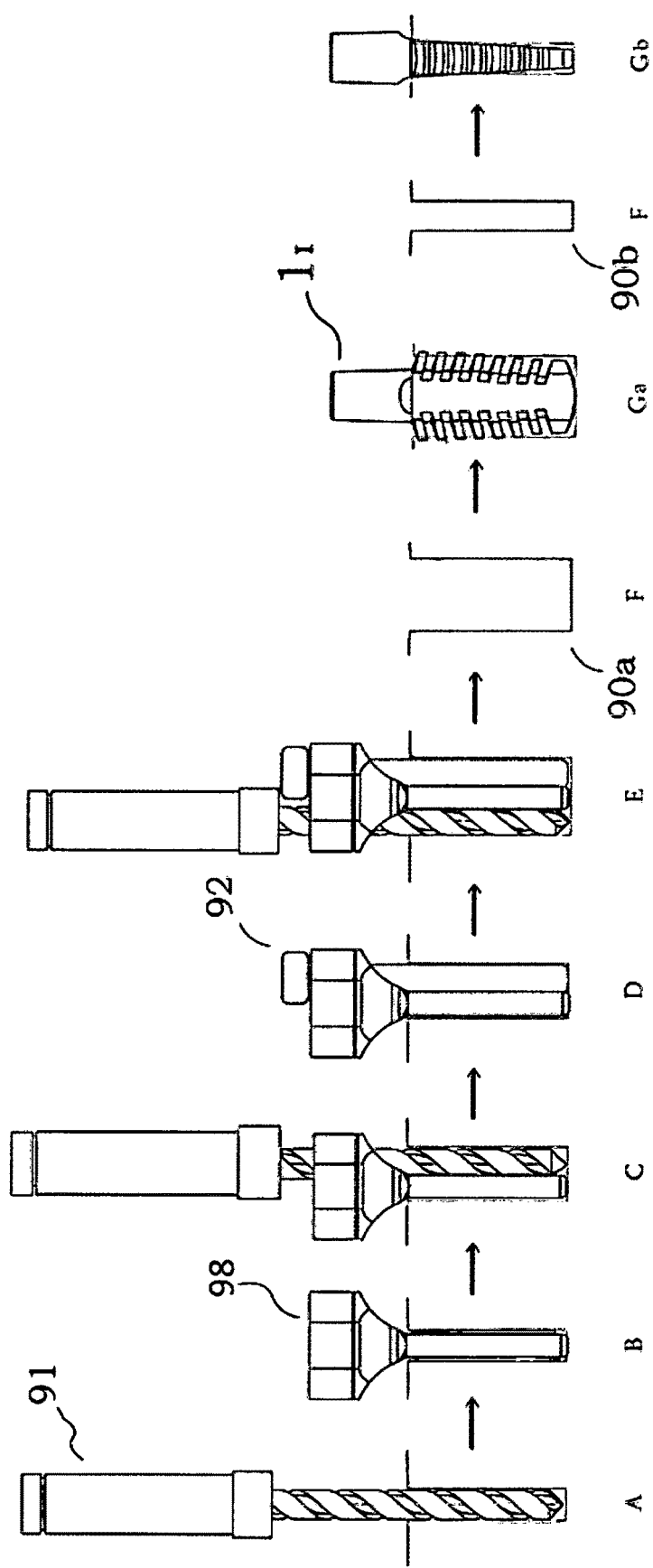

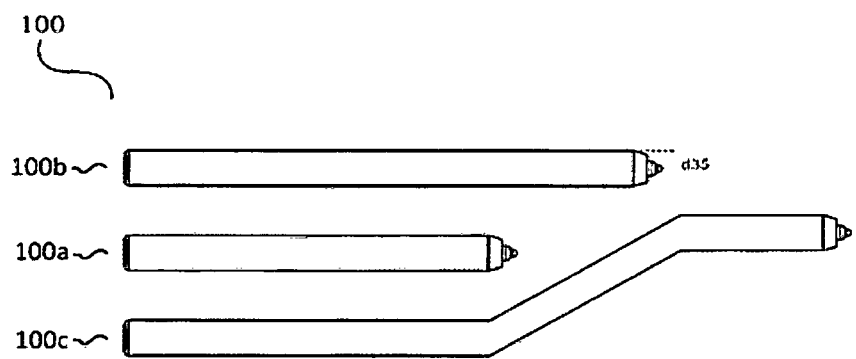
FIG.29
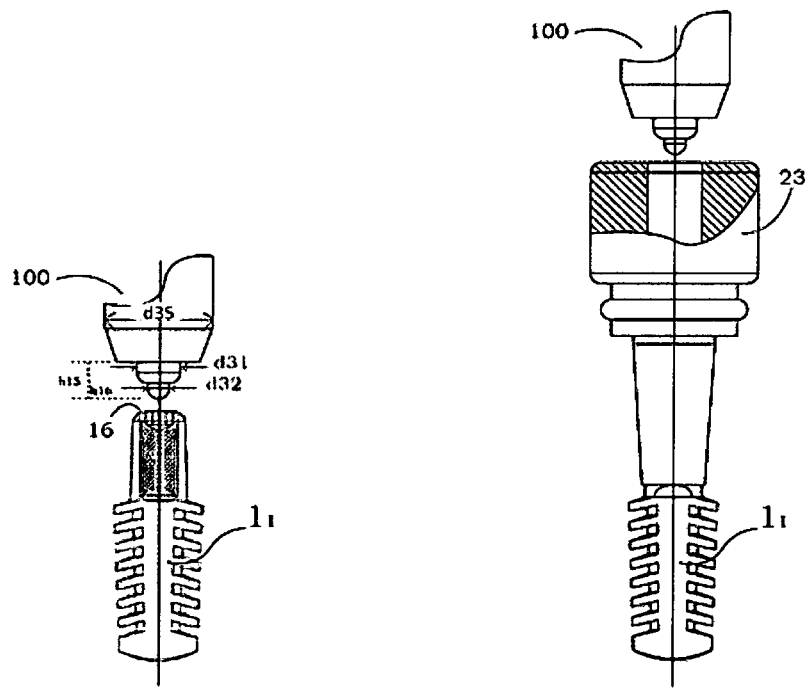
FIG.30A  FIG.30B

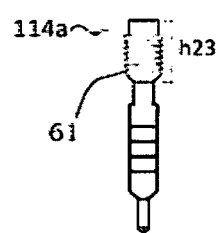 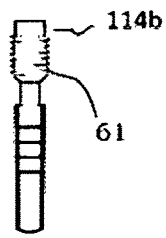 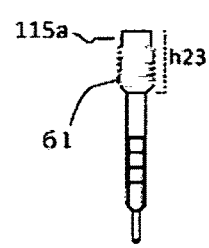 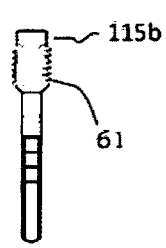
FIG.31A    FIG.31B        FIG.32A    FIG.32B
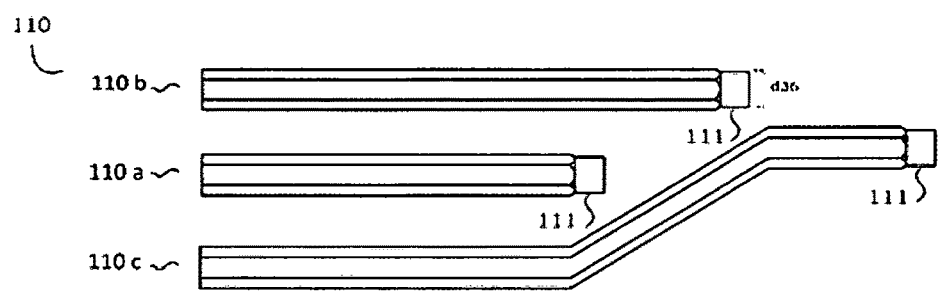
FIG.33
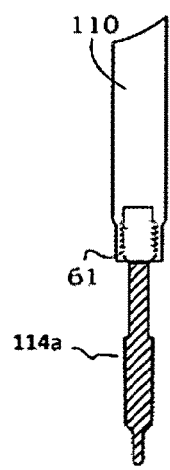
FIG.34

OVAL SECTION DENTAL IMPLANT

CROSS-REFERENCE TO RELATED APPLICATIONS

This application is a Continuation-in-Part Application of U.S. patent application Ser. No. 14/125,607, filed Dec. 12, 2013 in the United States Patent and Trademark Office, the entire disclosure of which is incorporated herein by reference in its entirety. This application is a 371 of PCT/SY2011/000002, filed Jun. 22, 2011, and claims foreign priority to SY2011060140 filed Jun. 13, 2011.

TECHNICAL DESCRIPTION OF THE INVENTION

The proposed invention relates to a dental implant and other parts associated with it, that enable the fitting or installing of one or more dental prosthesis or artificial teeth in the alveolar bone of a patient.

PRIOR ART

As is well known in the prior art, dental implants are generally threaded parts which have a circular section cross sectional shape to which, following a process of osseointegration or bone integration of the implant in said alveolar bone, a dental prosthesis with one or more artificial teeth is affixed. To achieve this, a series of associated parts are needed. These associated parts enable the insertion of the implant into the alveolar bone, the fixing of the dental prosthesis, and other actions. The diameters of the conventional implants are between 3.3 and 6 mm, which is not acceptable in special cases when the alveolar crest is thin.

The previous narrow and permanent implants have a diameter of about 3 mm, whereas the implant according to the proposed invention presents a section of the body with two dimensions: thickness and width. Although it has a narrow thickness of 2 mm, the cross-section of the body is bigger than the cross-section of the threaded body of the previous implants that have a diameter of 3 mm.

The implant is designed to be used in narrow areas at the jawbone and in the restricted narrow places between the Mandibular nerve and the lateral cortical plate due to non-protuberant beveled surfaces with a narrow thickness and smooth surfaces that leads to achieving safe inserting.

The implant has characteristics that enable it to be inserted in the narrowest bone which needs to be widened, after clipping the alveolar crest and separating the halves of the alveolar bone, which lead to easy inserting between the halves.

Prior art dental implants and associated parts have certain characteristics that prevent them from being used satisfactorily in certain treatment and rehabilitation applications and strategies. Specifically, in certain applications, some examples of which will be given below, implants have been shown to be essentially too thick. In other words, their external diameters are too large for the requirements of the application.

In a first application, it was common if there was a thin alveolar bone, to use a bone graft with its cost and complex surgery, and wait time. The implant according to the invention, with its reduced thickness and streamlined design, is inserted in the cleaved bone causing enlargement of the bone and installation of the implant at the same time.

In a second application, a narrow alveolus in the lingual and buccal direction present a problem in placing a strong implant.

In a third application, the prior art implants have a smallest diameter of approximately 3 mm, which is too large for replacement in some lower incisors and especially when the replacement is for an old single lost tooth, which makes the placement location very narrow in distal and mesial direction.

In a fourth application, orthodontic works causes a narrow alveolar crest bone between two dental roots which have been moved away from one another by the orthodontic treatment. The present implant is perfect to be inserted in this narrow crest bone, during bone augmentation. Said implant slides down with its mini thickness and both beveled surfaces and its thin curved apex to separate the bone's two sides and achieve implantation at the same time.

In a fifth application, the present implant also allows putting two implants to replace the upper or the lower molar. The first implant is put in the place of a mesial root and the other one in the place of the distal root.

A simple calculation on the mechanical drawing "Solid Works" program shows:

The space of the external connecting surface of the body of a prior art threaded implant with a diameter of 3 mm and a length of 8 mm is 90.04 mm$^2$, whereas the space of the external connecting surface of the body of the instant implant is 80.81 mm$^2$ although it has a thickness that equals approximately the half diameter of the threaded implant, and the space of the external connecting surface of the body of the instant implant is 114.76 mm2. That refers to the stability of the instant implant inside the jawbone despite its narrow thickness.

SUMMARY

In order to achieve the aforementioned objectives, the invention defines an oval section dental implant.

Similarly to conventional implants, the dental implant according to the invention comprises a head, a body and an apical end or an apex. The implant is solid and comprises a blind threaded hole for the connection of a screw.

The dental implant according to the proposed invention is categorized as "narrow" because one of its essential innovative characteristic is that it presents a reduced thickness or dimensions in comparison with prior art implants. This innovative characteristic is accompanied by other additional changes in the design of the implant, so that the reduction of the thickness of the implant does not reduce the implant's robustness, preloading capability, ability to prevent the appearance of breakage points, and other necessary qualities.

The dental implant comprises a head, body and an apex.

The head (2) of the implant (1) has a male conical shape with a height of 4 mm and a diameter of between 2.5 and 2.7 mm and with a 1.5° slope, which achieves the strongest connection according to mechanics without the need of assistance by a polygonal shape, and by that it prevents the rotation of the associated parts above it. Said head (2) has a blind threaded hole (11) which has a depth of between 3-3.5 mm and comprises a total of between 7-9 turns of thread, said thread presenting an internal diameter (d3) of between 1.6 and 1.7 mm and an external diameter (d4) of between 1.9 and 2 mm, which means that the bind threaded hole (11) is completely included in the head (2) and that allows making the maximum thickness of 2 mm of the body (3) of the implant (1) near the head. The retention screw (46), with a diameter of 2 mm, which is used with said head achieves with its relatively large diameter a high tensile strength, increased fixing of the associated parts, and prevents rotation. In the lower part of the head there are two curved surfaces (9) which extend from the two beveled surfaces of the body to the external surface of the head with a height (h3) of 0.5 mm as it will be mentioned below. The functional part of the head is 3.5 mm from the upper face to the top of the two curved surfaces. These characteristics achieve strong and various connection positions with associated parts of the implant (1) that enable the fitting or installing of one or more dental prosthesis or artificial teeth in the alveolar bone.

The body of the implant has two sizes.

The body (3) of the implant (1i) comprises a central conical part (10) which is beveled on two sides and holds downward inclined protuberances (6) on the other two sides and has a semi-circle end. Said protuberances have a thickness (h20) of 0.4 mm and between the protuberances there are spaces (7) with a height (h21) of 0.5 mm. The external surface of the body begins from the side of head with an external maximum width (w1) of 4.25 mm and ends near the apex with an external minimum width (w2) of 3.5 mm. It also has an internal maximum width (w3) of 2.25 mm near the head and an internal minimum width (w4) of 1.5 mm near the apex. All these said sizes in the body are applied to all lengths (h4) of 8, 10, 12 and 14 mm. The figures also shows the beveled surface (10) between left and right protuberances of the body (3). The apex (4) of the implant has a curved surface.

In another embodiment, the body (3) of the implant (1) comprises a central conical part (10) which is beveled from two sides and holds protuberances (6) on the other two sides, which are inclined down and have a semi-circle end. Said protuberances have a thickness (h20) of 0.4 mm and between the protuberances there are spaces (7) with a height (h21) of 0.5 mm. The external surface of the body begins from the side of the head with an external maximum width (w5) of 3 mm and ends near the apex with an external minimum width (w6) of 2.3 mm. It also has an internal maximum width (w7) of 2.1 mm near the head and an internal minimum width (w8) of 1.4 mm near the apex. All these said sizes of the body are applied on all lengths (h4) of 8, 10, 12 and 14 mm. The figures also show the beveled surface (10) between left and right protuberances of the body (3). The apex (4) of the implant has a curved surface.

The length of the implant means the length of the body and is measured from the bottom of the curved surface of the head and extends to the apex. Of course, the invention does not discard using other lengths not comprised in this preferred range.

The proposed invention further discloses a first unit of associated parts known as a carrier unit, which comprises a bushing, a retention screw and a seal. Said carrier unit is used to carry and insert the dental implant into a socket which has been previously drilled in the patient's alveolar bone by a set which comprises a surgery guide, assistant guide and drills. The bushing (23) is to be connected directly to the head (2) of the implant (1), and thus includes a female cylindrical hole (27) with a diameter (d9) of 2.7 mm and a height (h7) of 3.5 mm in which the conical head is housed. The retention screw (24) of the carrier unit (22) is screwed into the blind threaded hole (11) of the implant between 7-9 turns of thread and presents a threaded area (40) with an external diameter (d7) of 1.9 mm and an internal diameter (d8) of 1.6 mm. The area that the seal is housed presents a diameter (d20) of 5.8 mm. The retention screw can be screwed by hexagonal screwdriver with a diameter of 1.2 mm.

Another part associated with the dental implant is healing abutment (17), which is connected on the functional part of the conical head (2) of the implant (1) with a special retention screw (18) to cover the implant during osseointegration and enables the gum to heal. Healing abutment includes a female conical hole (19) in which the functional conical part of the head (2) is housed. Said hole (19) is suitable with the male functional conical part of the head (2) of the implant (1).

Another part associated with the dental implant (1) is the locking screw (16), which is a part that is threaded to the implant in order to cover the implant during osseointegration. Said locking screw (16) is visible in the mouth and it has a hexagonal hole with a diameter (d10) of 1.25 mm at the center of the upper face. It also has rounded edges to protect the soft tissues of the mouth from the harm of the upper head edges of the implant. It comprises a threaded area (42) that is provided with between 5-6 turns of thread. The threaded area (42) has an external diameter (d6) of between 1.8 and 1.9 mm and an internal diameter (d5) of between 1.5 and 1.6 mm.

The proposed invention also discloses a prosthesis retention screw (46) and a final abutment (45), which comprises two areas: a cylindrical area and a shoulder area. Said cylindrical area has a diameter (d39) of 3.5 mm and has a circular grooves around it and a beveled surface. The cylindrical area also has a height (h24) of between 11 and 17 mm. Said shoulder area has an external diameter (d45) of 4 mm and a height (h25) of 2.3 mm and it is a main part to comprise the prosthesis. Said final abutment (45) has a retention screw (46) which has a diameter (d25) of 2.5 mm for the head, and a thread (49) with an external diameter (d6) of between 1.8 and 1.9 mm. It also has an internal diameter (d5) of between 1.6 and 1.7 mm. Said final abutment is the part that is inserted permanently in the patient's mouth and which supports a dental prosthesis. The final abutment (45) is to be connected directly to the head (2) of the implant (1), and thus includes a female conical hole (47) in which the male functional conical part of the head is housed. Said hole is suitable with the male functional conical part of the head (2) of the implant (1). It also has a hole in the upper part of it with a diameter (d12) of 2.6 mm and the retention screw is housed inside it.

Additionally, the proposed invention discloses an implant impression coping, which is connected to the functional head of the implant before making an impression of the patient's mouth. The implant impression coping (43) is connected directly to the head (2) of the implant (1), and thus includes a female conical hole (49) in which the male functional conical part of the head is housed. Said female conical hole (49) is suitable with the male functional conical part of the head (2) of the implant (1). The upper part of the screw appears above the implant impression coping about 3 mm and this associated part will be used by an open tray stage. The external surface of the implant impression coping has two cylindrical protuberances with sharp edges that allow it to be retained in the impression when it is removed from the patient's mouth. Said external surface has a beveled surface.

Additionally, the proposed invention discloses an implant impression coping, which is connected to the functional head of the implant before making an impression of the patient's mouth. The implant impression coping (48) is connected directly to the head (2) of the implant (1), and thus includes a female conical hole (49) in which the male functional conical part of the head is housed. Said female conical hole (49) is suitable with the male functional conical part of the implant (1). The upper part of the screw ends at the upper surface of the implant impression coping and this associated part will be used in a closed tray stage. The external surface of the implant impression coping has two cylindrical protuberances with a rounded edges that do not allow it to be retained in the impression when it's removed from the patient's mouth. Said external surface has a beveled surface.

The proposed invention also discloses a laboratory analog (58), which is a part used in the laboratory during the forming of the positive of the patient's mouth, for simulating the set of parts formed by the same design and dimensions of the head (2) of the implant (1) and it is marked with a height of 3.5 mm by grooves around it to refer to the borders of the functional part of the head (2). Said head (2) has a blind threaded hole (11) with the same characterizes of the blind threaded hole of the implant (1). The body of the analog (58) has a height of (h29) of 8.5 mm, three retention cylinders around it and a beveled surface.

The proposed invention also discloses a special instrument because of the shape of the said implant (1), called a surgery guide (98). The surgery guide comprises a body and a protuberance at the bottom of it. The body has an extended shape with semi-circle sides and there are two parallel symmetrical corresponding holes with a diameter (d15) of 1.5 mm and a distance (d30) of 3.75 mm between the two external edges of the cylindrical holes (96). The protuberance has a cylindrical shape with a height (h10) of 8 mm and it holds two paths on its both sides that are a result of the intersection between the two cylindrical holes with the cylindrical extension in the bottom of the body. Said surgery guide with its protuberance that has a height of 8 mm are used with all lengths of drills and implants (1).

The proposed invention also discloses a special instrument because of the shape of the said implant (1), called a surgery guide (88). The surgery guide comprises a body and a protuberance at the bottom of it. The body has an extended shape with semi-circle sides and there are two parallel symmetrical corresponding holes with a diameter (d17) of 1 mm and a distance (d40) of 2.5 mm between the two external edges of the cylindrical holes (86). The protuberance has a cylindrical shape with a height (h21) of 8 mm and it holds two paths on its both sides that are a result of the intersection between the two cylindrical holes with the cylindrical extension in the bottom of the body. Said surgery guide with its protuberance that has a height of 8 mm is used with all lengths of drills and implants (1).

The mechanical working of the surgery guide, refers to the steps of preparing the socket of the implant (1) in the crest alveolar bone by a surgery guide (98), assistant guide (92) and drill by the following steps:

(FIG. 28A) Refers to first inserting the drill with a diameter of 1.5 mm in the suitable place in alveolar crest bone.

(FIG. 28B) Refers to next removing the drill and inserting the surgery guide (98) in the prepared socket.

(FIG. 28C) Refers to next inserting the same drill in one of the holes of the surgery guide.

(FIG. 28D) Refers to next keeping the surgery guide in its place and removing the drill and inserting a special assistant guide (92) in the place of the drill.

(FIG. 28E) Refers to next keeping the surgery guide and the assistant guide in its place as in FIG. 28D and inserting the drill in the other hole of the surgery guide.

(FIG. 28F) Refers to next removing the tools for preparing the socket and shows a front view (90a) of the section of the empty socket.

(FIG. 28Ga) Refers to the front view of the section of the socket and shows the position of both sides of the implant (11) with its protuberances in the socket after insertion. It also explains the pressing of the protuberances on the upper half of the socket's walls.

(FIG. 28F) Shows a view of the lateral section (90b) of the empty socket.

(FIG. 28Gb) Shows the position of the two beveled sides of the implant and the pressing of them on the upper lateral half of the socket's walls after insertion of the implant.

The proposed invention also discloses a set of pushing instruments (100), which are used for pushing the implant into its socket with a functional head that is provided with two protuberances one inside the other. The smaller is suitable for the hexagonal hole of the locking screw (16) and the bigger is suitable for the posterior hole of carrier unit (22). Each instrument comprises a cylindrical part with lengths of 5 cm (100a), 7 cm (100b) and 10 cm (100c) that are used to reach difficult places.

The proposed invention also discloses special instruments which are used to prepare the socket of the implant by condensation method. Each of said instruments has a screw (61) with a height (h23) of 8 mm and a diameter of 5 mm. It also has a non-threaded area to help inserting the condensation instruments in their holders. The condensation instruments have two types: The first one (115a-114a) is a primary instrument that has a cylindrical part with a diameter of between 1 and 1.5 mm and length of 4 mm. This cylindrical part is located at the bottom of the functional head. The section of the functional head has two semi-circle sides and has the same dimensions of the preparing socket 1.5×3.75 mm for implant (11) 1×2.5 mm for implant (1). The second instrument (115b-114b) is inserted after the first one (115a-114a) and is placed to complete preparing the location of the cylindrical part of the first instrument (114a-115a). Said condensation instruments have holders (110) with several lengths 5, 7 and 10 mm and the last one is designed to reach difficult places in the mouth. All these holders have a functional head (111) that includes a threaded hole with a diameter of 5 mm which is suitable for connecting with the screw of condensation instruments.

BRIEF DESCRIPTION OF THE DRAWINGS

FIG. 1A shows an elevation view and FIG. 1B shows a central sectional elevation in the width of the implant (1i). FIG. 1A1 shows view of the top (12a) and FIG. 1A2 shows the bottom view (13a) of the implant and FIG. 1A3 shows an upper (8a) and FIG. 1A4 shows a lower (5a) cross-section of the body of the implant.

FIG. 2A shows a lateral elevation and FIG. 2B shows a lateral central sectional elevation of the thickness of the implant (1i) which has a width of 4.25 mm and the length of the body of 8 mm according to the proposed invention.

FIG. 3A shows an elevation and FIG. 3B shows a central sectional elevation of the width of the implant (1ii). FIG. 3A1 shows view of the top (12b) and FIG. 3A2 shows the bottom view (13b) of the implant and FIG. 3A3 shows a cross-section in the upper (8b) and FIG. 3A4 shows a lower (5b) view of the body of the implant (1) according to the proposed invention.

FIG. 5 shows an elevation view of a carrier unit according to the proposed invention.

FIG. 6 shows a cross-sectional elevation view of the carrier unit of FIG. 5.

FIG. 7A shows an elevation and FIG. 7B shows a cross-sectional elevation of the carrier unit of FIG. 5 assembled on the dental implant of FIG. 1.

FIG. 8 shows an elevation of a healing abutment unit according to the proposed invention.

FIG. 9 shows a cross-sectional elevation of a healing abutment unit according to the proposed invention.

FIG. 10A shows an elevation and FIG. 10B shows a cross-sectional elevation of the healing abutment unit of FIG. 8 assembled on the dental implant of FIG. 1.

FIG. 11A shows an elevation view and FIG. 11B shows a cross-sectional elevation view of a locking screw according to the proposed invention.

FIG. 12A shows an elevation view and FIG. 12B shows a cross-sectional elevation view of a locking screw of FIG. 11 assembled on the dental implant of FIG. 1.

FIG. 14A shows a cross-sectional elevation view of the final abutment and FIG. 146 shows a cross-sectional elevation view of the prosthesis retention screw of FIG. 13

FIG. 25A shows an anterior elevation and FIG. 25B shows a central section elevation of the width of the surgery guide. FIG. 25C shows an upper and FIG. 25D shows a lower view of the surgery guide of the implant (4.25×2).

FIG. 26A shows an anterior elevation and FIG. 26B shows a central section elevation of the width of the surgery guide. FIG. 26C shows an upper and FIG. 26D shows a lower view of the surgery guide of the implant (3×1.5).

FIG. 27A shows a lateral elevation of the width of the surgery guide (88) and FIG. 27B shows a later elevation of the width of the surgery guide (98).

FIG. 28A through FIG. 28Gb show steps of preparing the socket of the implant.

FIG. 29 shows a set of pushing instruments for the implant.

FIG. 30A shows the pushing instruments during the work with a holder of the implant and FIG. 30B shows the pushing instruments during use with a locking screw.

FIGS. 31A and 31B shows multiple view of a condensation instrument of the implant.

FIGS. 32A and 32B shows multiple views of a condensation instrument of the implant.

FIG. 33 shows a kit of holders of the condensation instruments.

FIG. 34 shows the condensation instrument of the implant assembled on its holder.

DETAILED DESCRIPTION OF EXEMPLARY EMBODIMENTS

Figure 4B:
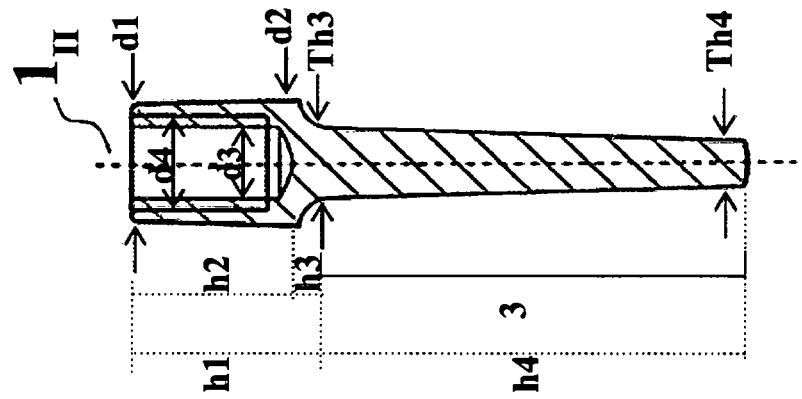
FIG. 4A shows an elevation and FIG. 4B shows a lateral central sectional elevation of the thickness of the implant which has a width of 3 mm and a length of the body of 8 mm according to the proposed invention.

FIGS. 1A-B shows an elevation and a central section elevation in the width of the implant (1i). FIGS. 1A1-A4 shows views of the top (12a) and the bottom (13a) of the implant and also shows lower cross-section (5) of the body and upper cross-section (8a) of the body that shows the central part (10) and its two protuberance sections (6) of the body of the implant with its semi-circle end. The implant (1i) is formed of a head (2), a body (3) and an apical end or an apex (4). The implant presents a blind threaded hole (11) in its head for connection with a screw. According to the proposed invention, the body (3) comprises a central conical part (10) which is beveled from the both sides and holds protuberances (6) on the other both sides that are inclined down and have a semi-circle end. Said protuberances have parallel upper and lower surfaces and a uniform thickness as shown in FIG. 1. Said protuberances have a thickness (h20) of 0.4 mm and between the protuberances there are spaces (7) with a height (h21) of 0.5 mm. The external surface of the body begins from the side of head with an external maximum width (w1) of 4.25 mm and ends near the apex with an external minimum width (w2) of 3.5 mm. It also has an internal maximum width (w3) of 2.25 mm near the head and an internal minimum width (w4) of 1.5 mm near the apex. Said implant (1i) has a height (h4) of 8 mm. All the disclosed sizes of the body are applied to other heights (h4) of 10, 12 and 14 mm as well. FIGS. 1A-B also shows the beveled surface (10) between left and right protuberances of the body (3).

The apex (4) of the implant has a curved surface.

The head (2) of the implant (1i) comprises of external conical surface with a 1.5 degree slope and it begins from the body (3) with a maximum diameter (d2) of 2.7 mm and ends at the top of the implant with a minimum diameter (d1) of 2.5 mm. The height (hl) of the head is 4 mm. In the lower part of the head there are two curved surfaces (9) which extend from the two beveled surfaces of the body to the external surface of the head with a height (h3) of 0.5 mm as it will be mentioned in FIG. 2. The upper surface of the head (2) presents a blind threaded hole (11) which has a height of between 3-3.6 mm and comprises a total of between 7-9 turns of thread, said thread presenting an internal diameter (d3) of 1.6 mm and an external diameter (d4) of 2 mm.

The head (2) has an external conical shape with a 1.5° slope and suitable height. These characteristics allow a strong and various connection positions with associated parts of the implant that enable the fitting or installing of one or more dental prosthesis or artificial teeth in the alveolar bone.

The length and diameter of the thread achieve a high tensile strength and stability in comparison with other narrow implants.

FIGS. 2A-B show a lateral elevation view and a central section elevation of the thickness of the implant (1i) which has a width of 4.25 mm, thickness (Th1) of 2 mm and the length of the body of 8 mm according to the proposed invention. Said implant comprises a head (2), a body (3) and an apex (4). Said head (2) has a two curved surfaces (9) in the lower part of it. It extends from the two beveled surfaces of the body to the external surface of the head with a height (h3) of 0.5 mm. The head (2) of the implant (1l) has a uniform shape for all implants (1i) that have lengths of 8, 10, 12 and 14 mm.

FIG. 2 also shows the two beveled surfaces on the both sides of the body and shows the protuberances (6) in front of the lateral view. The body of the implant (1i) has a thickness of upper side (Th1) of 2 mm and lower side (Th2) of 1.25 mm of the body (3) of the implant (1i). Said body comprises a central conic dumbbell shape and it is beveled from both sides. It also holds from its other two side's protuberances (6) with a semi-circle end.

The apex (4) of the implant has a curved surface.

Figure 3B:
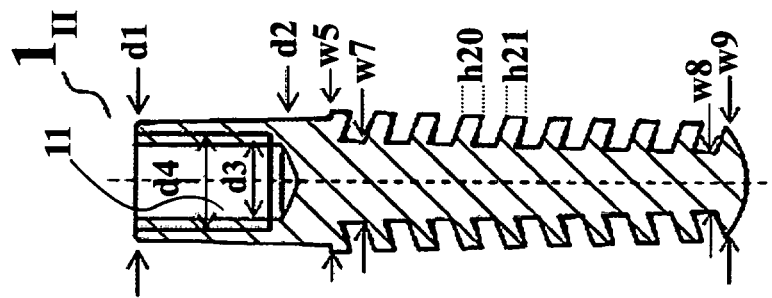

FIGS. 3A-B shows an elevation and a central section elevation in the width of the implant (1ii). FIGS. 3A1-A4 shows views of the top (12b) and the bottom (13b) of the implant and also shows lower cross-section (5b) of the body and upper cross-section (8b) of the body that shows the central part (10) and its two protuberance sections (6) of the body of the implant with the semi-circle ends. The implant (1ii) is formed of a head (2), a body (3) and an apical end or apex (4). The implant presents a blind threaded hole (11) in its head for connection with a screw. According to the proposed invention, the body (3) comprises a central conical dumbbell part (10) which is beveled from two sides and holds protuberances (6) on the other two sides, which are inclined down and have a semi-circle end. Said protuberances have a thickness (h20) of 0.4 mm. Between the protuberances there are spaces (7) with a height (h21) of 0.5 mm. The external surface of the body begins from the side of the head with an external maximum width (w5) of 3 mm and ends near the apex with an external minimum width (w6) of 2.3 mm. It also has an internal maximum width (w7) of 2.1 mm near the head and an internal minimum width (w8) of 1.4 mm near the apex. Said implant (10 has a height (h4) of 8 mm. All the sizes in the body are applied on other heights (h4) of 10, 12 and 14 mm. FIGS. 3A-B also shows the beveled surface (10) between left and right protuberance portions of the body (3).

The apex (4) of the implant has a curved surface.

The head (2) of the implant (1ii) is the same one of said head of the implant (1i) and with all lengths of the body.

Figure 4A:
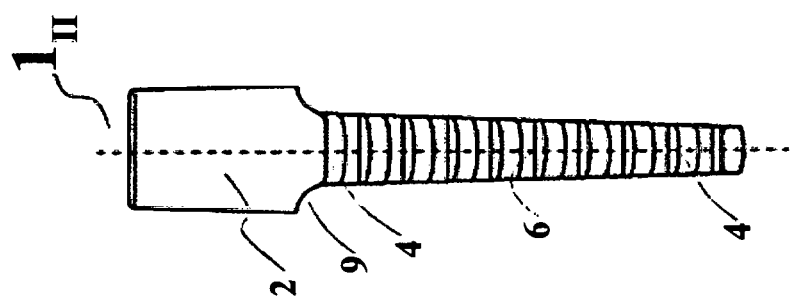

FIGS. 4A-B shows a lateral elevation view and a lateral central section elevation of the thickness of the implant (1ii) which has a width of 3 mm, thickness (Th3) of 1.5 mm and a length of the body of 8 mm according to the proposed invention. Said implant comprises of a head (2), body (3) and apex (4). Said head (2) has two curved surfaces (9) in the lower part of it. They extend from the two beveled surfaces of the body to the external surface of the head with a height (h3) of 0.5 mm. The head (2) of the implant (1ii) has a uniform shape for all implants of lengths (h4) of 8, 10, 12 and 14 mm.

FIGS. 4A-B also shows the two beveled surfaces on the both sides of the body and shows the protuberances (6) in front of the lateral view. The body of the implant (1ii) has a thickness of upper side (Th3) of 1.5 mm and lower side (Th4) of 0.8 mm of the body (3) of the implant. Said body comprises a central conic dumbbell shape and is beveled from two sides. It also holds from its other two sides the protuberances (6) with semi-circle ends.

The apex (4) of the implant has a curved surface.

FIGS. 5 and 6 show an elevation and a cross-sectional elevation of a carrier unit (22) according to the proposed invention. The carrier unit (22) comprises a bushing (23), a retention screw (24) and a seal (25). The bushing (23) is to be connected directly to the head (2) of the implant (1i), and thus includes a female cylindrical hole (27) with a diameter (d9) of 2.7 mm and a height (h7) of 3.5 mm in which the conical head is housed. Said hole is large enough to install the head of the implant. The retention screw (24) of the carrier unit (22) is screwed into the blind threaded hole (11) of the implant (1i) between 7-9 turns of thread and presents a threaded area (40) with an external diameter (d6) of 1.9 mm an internal diameter (d5) of 1.5 mm. The area where the seal is housed presents a diameter (d20) of 5.8 mm. The retention screw can be screwed by hexagonal screwdriver with diameter of 1.2 mm of the hex.

FIG. 7 shows the carrier unit (22) assembled on the dental implant (1i), for which the bushing (23) has been connected onto conical head (2) of the implant (1i) and the threaded area (40) of the retention screw (24) has been connected to the blind threaded hole (11) of the implant (1i). The innovative characteristics of the implant (1i) in combination with the innovative characteristics of the carrier unit (22) allow the narrow parts to work properly in practice.

FIG. 8 shows an elevation of a healing abutment (17) and retention screw (18) according to the proposed invention FIG. 9 shows a cross-sectional elevation of the healing abutment (17) and retention screw (18). The healing abutment (17) comprises a healing body. Said healing body has a cylindrical shape with curved edges and has a height (h5) of 6 mm, and an external diameter (d26) of 3.3 mm. Healing abutment is to be connected directly to the functional part of the conical head (2) of the implant (1i), and thus includes a female conical hole (19) in which the male functional conical part of the head is housed. Said hole is suitable for the size of the functional part of the head (2) of the implant (1).

FIGS. 10A-B show the healing abutment (17) assembled on the dental implant (1i), more specifically having been connected onto the conical head (2) of the implant (1i) and having screwed the threaded area (41) of the retention screw (18) to the blind threaded hole (11) of the implant (1i). The innovative characteristics of the implant (1i) in combination with the innovative characteristics of the healing abutment (17) allows the narrow parts to work properly in practice.

FIGS. 11A-B show an elevation and a cross-sectional elevation of a locking screw (16) according to the proposed invention, characterized in that it comprises a threaded area (42) provided with between 5-6 turns of thread. The threaded area (42) has an external diameter (d6) of between 1.8 and 1.9 mm and an internal diameter (d5) of between 1.5 and 1.6 mm.

FIGS. 12A-B show an elevation and a cross-sectional elevation of the locking screw (16) assembled on the dental implant (1i) according to the proposed invention, after the threaded area (42) of the locking screw (16) has been connected to the blind threaded hole (11) of the implant (1i). The innovative characteristics of the implant (1i) in combination with the innovative characteristics of the locking screw (16) allow the narrow parts to work properly in practice.

Figure 13A:
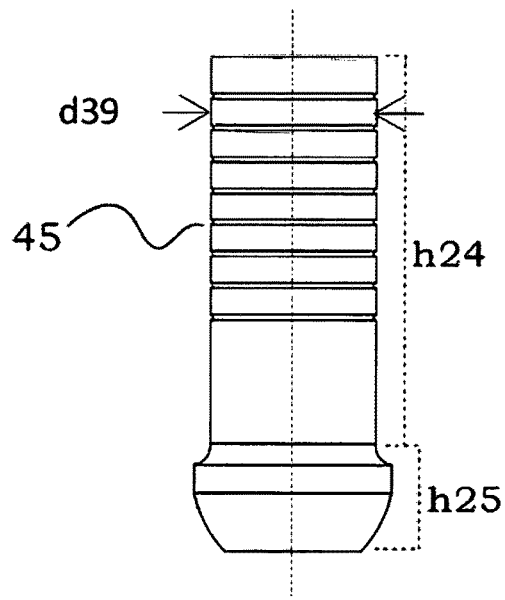
FIG. 13A shows an elevation view of a final abutment and FIG. 13B shows an elevation view of a prosthesis retention screw according to the proposed invention.
Figure 13B:
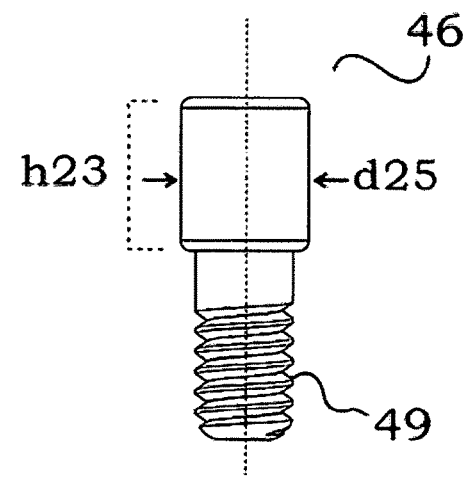

FIGS. 13A-B show an elevation of a final abutment (45) and retention screw (46) according to the proposed invention.

Figure 14A:
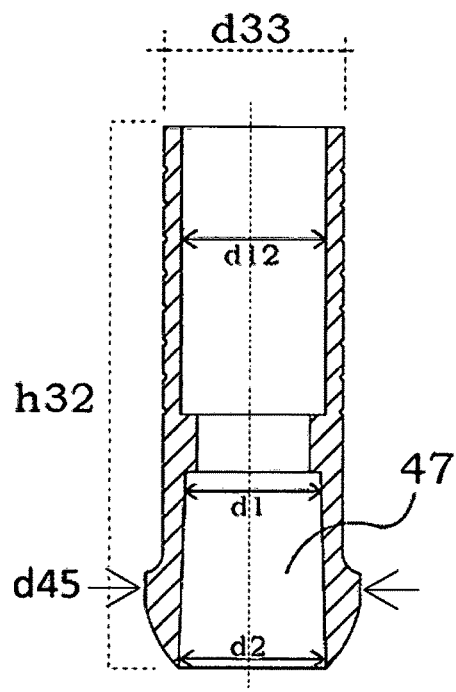
Figure 14B:
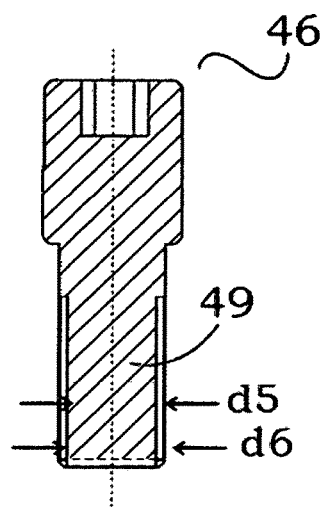

FIGS. 14A-B show a cross-sectional elevation of the final abutment (45) and retention screw (46). The final abutment (45) is to be connected directly to the head (2) of the implant (1i), and thus includes a female conical hole (47) in which the functional conical part of the head is housed. Said female conical hole is suitable with the male functional conical part of the head (2) of the implant (1i).

Figure 15A:
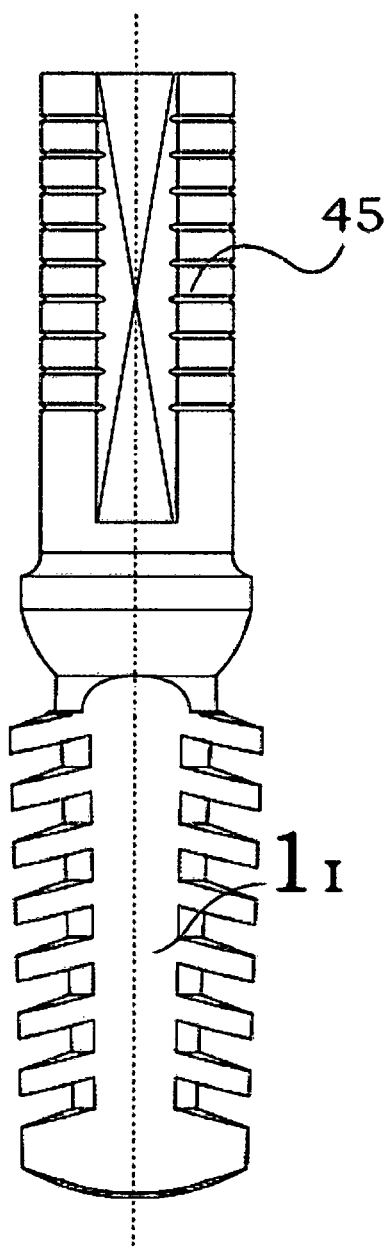
FIG. 15A shows an elevation view and FIG. 15B shows a cross-sectional elevation view of the final abutment and of the prosthesis retention screw of FIG. 13 assembled on the dental implant of FIG. 1.
Figure 15B:
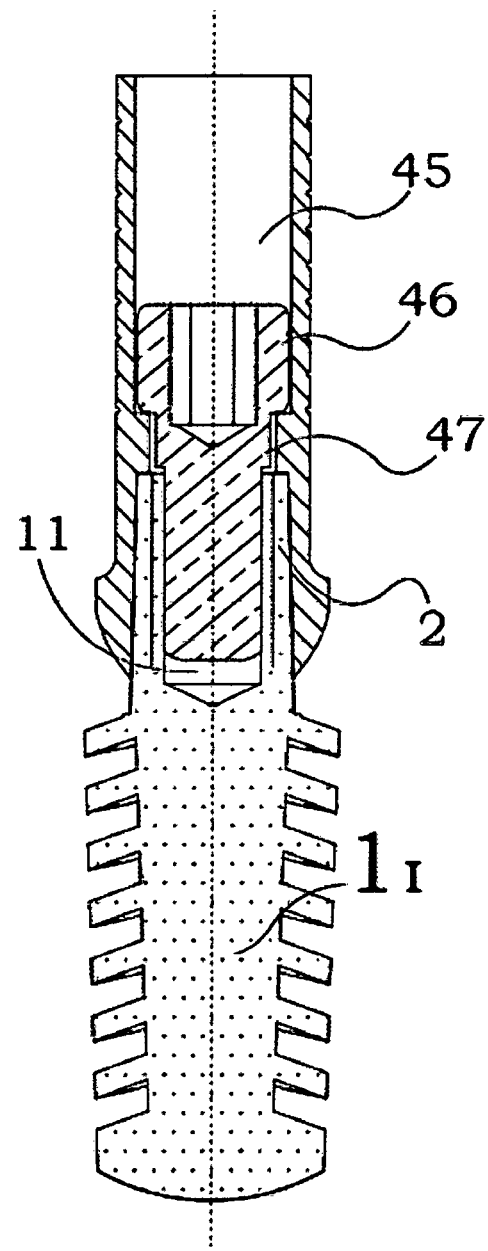
Figure 16A:
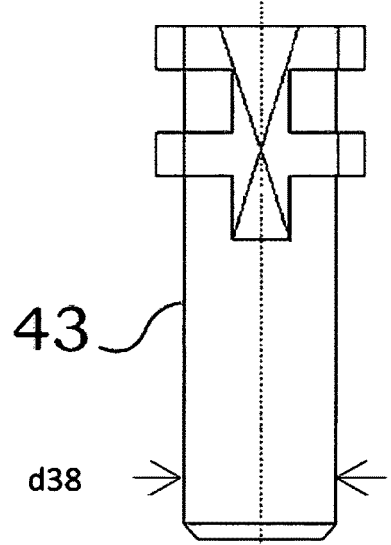
FIG. 16A shows an elevation view of an open tray implant impression coping and FIG. 16B shows an elevation view of a screw of the open tray implant impression coping according to the proposed invention.
Figure 16B:
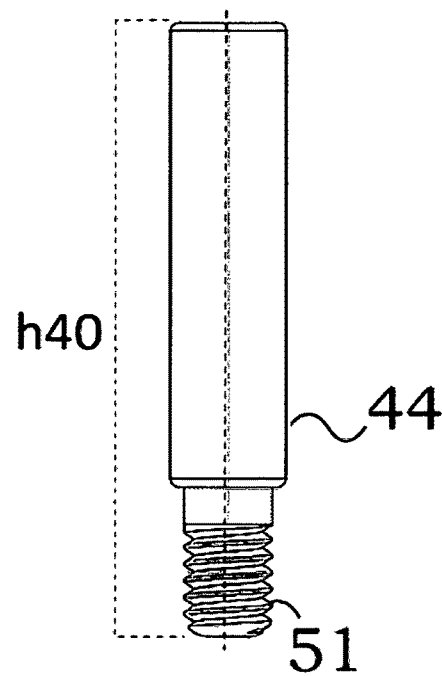
Figure 17A:
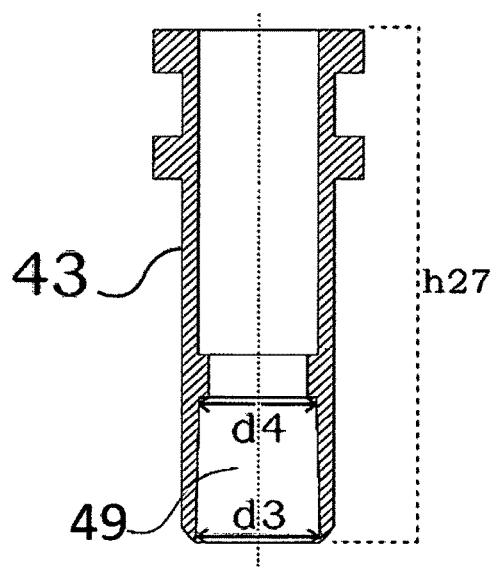
FIG. 17A shows a cross-sectional elevation view of the open tray implant impression coping and FIG. 17B shows a cross-sectional elevation view of the screw of FIG. 16.
Figure 17B:
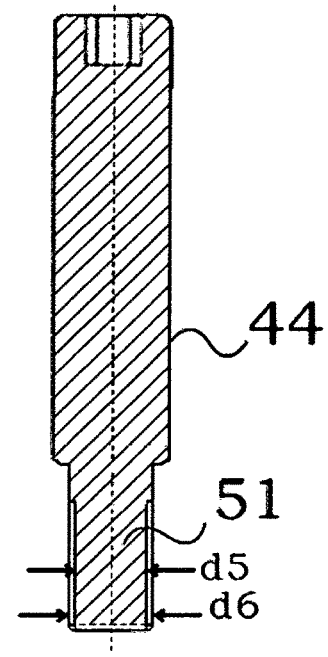

FIGS. 15A-B show the final abutment (45) assembled on the dental implant (1i), more specifically having been connected onto the conical head (2) of the implant (1i) and having screwed the threaded area (49) of the retention screw (46) of the final abutment (45) to the blind threaded hole (11) of the implant (1i). The innovative characteristics of the implant (1i) in combination with the innovative characteristics of the final abutment (45) allow the narrow parts to work properly in practice.

FIGS. 16A-B and 17A-B show an elevation and a cross-sectional elevation of an implant impression coping (43) and the screw (44) of the implant impression coping. The implant impression coping (43) is connected directly to the head (2) of the implant (1i), and thus includes a female conical hole (49) in which the male functional conical part of the head is housed. Said female conical hole (49) hole is suitable with the male functional conical part of the head (2) of the implant (1i). The external surface of the implant impression coping (43) has two cylindrical protuberances with a sharp edges that allow it to be retained in the impression when it is removed from the patient's mouth. Said external surface has a beveled surface.

Figure 18A:
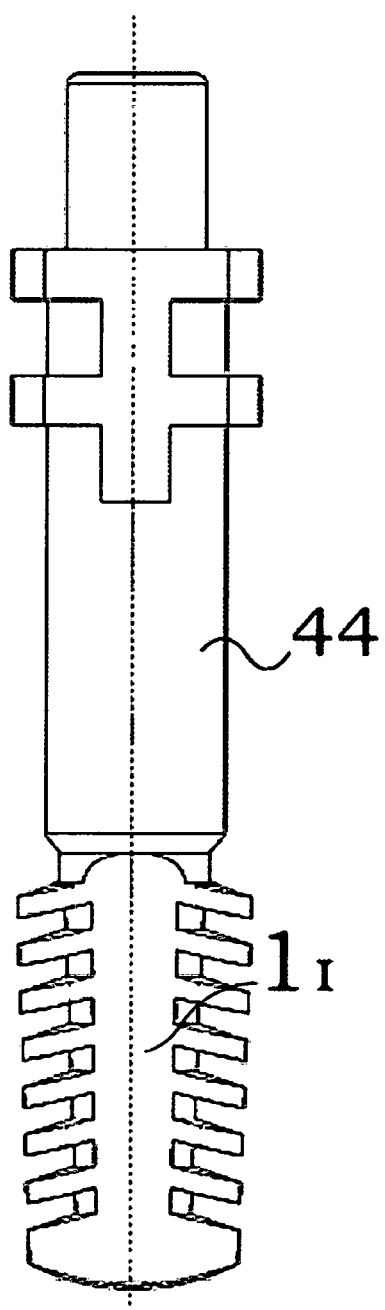
FIG. 18A shows an elevation and FIG. 18B shows a cross-sectional elevation of the open tray implant impression coping and of the screw of FIG. 16 assembled on the dental implant of FIG. 1.
Figure 18B:
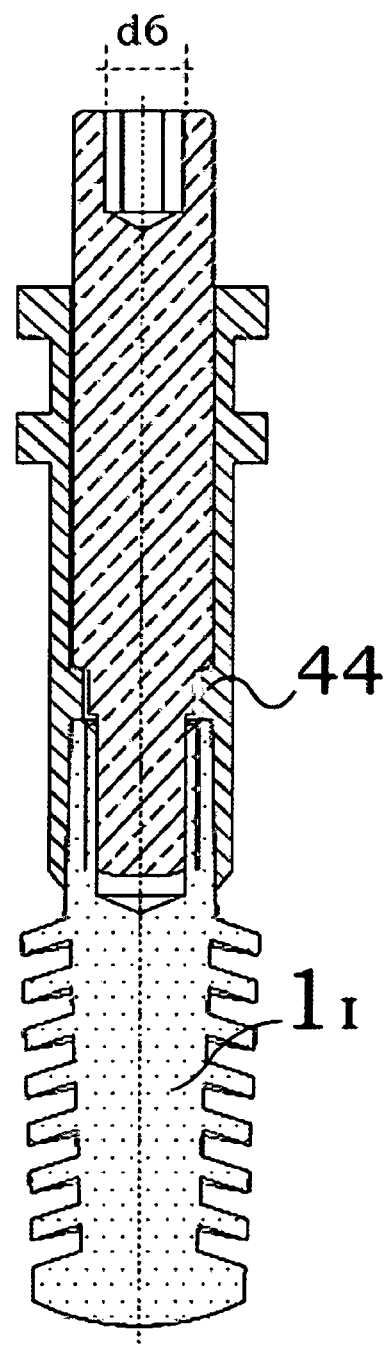
Figure 19A:
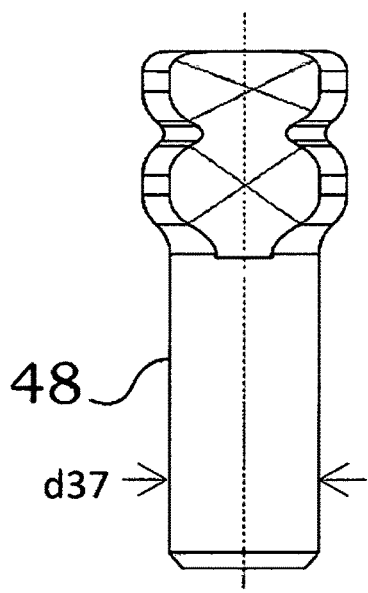
FIG. 19A shows an elevation of a closed tray implant impression coping and FIG. 19B shows an elevation of a screw of the closed tray implant impression coping according to the proposed invention.
Figure 19B:
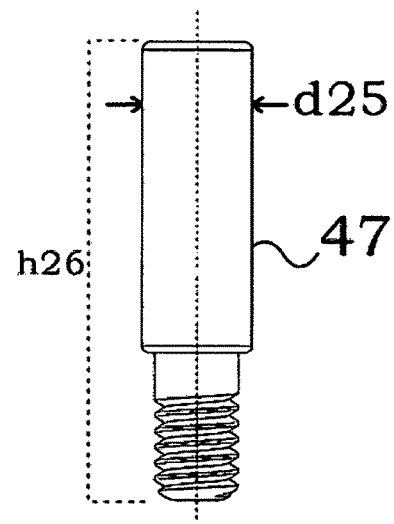
Figure 20A:
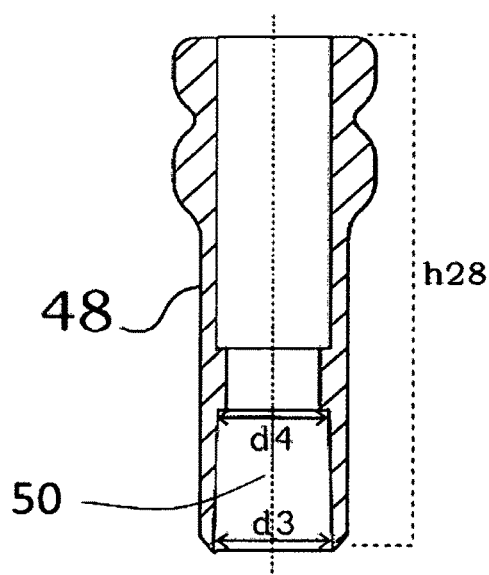
FIG. 20A shows a cross-sectional elevation of the closed tray implant impression coping and FIG. 20B shows a cross sectional elevation of the screw of FIG. 19.
Figure 20B:
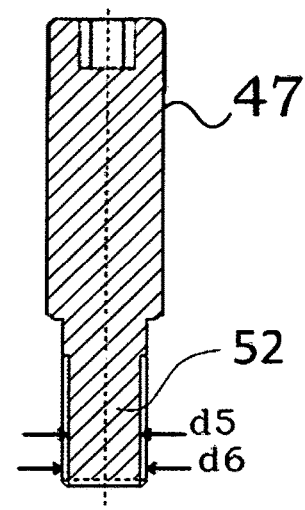

FIGS. 18A-B show the implant impression coping (43) assembled on the dental implant (1i), more specifically having been connected onto the conical head (2) of the implant (1i) and having screwed the threaded area (51) of the retention screw (44) of the implant impression coping (43) to the blind threaded hole (11) of the implant (1i). The innovative characteristics of the implant (1i) in combination with the innovative characteristics of the implant impression coping (43) allow the narrow parts to work properly in practice. We note that the upper part of the screw appears above the implant impression coping and will be used by an open tray stage.

FIGS. 19A-B and 20A-B show an elevation and a cross-sectional elevation of an alternative implant impression coping (48) and the screw (47) of the implant impression coping. The implant impression coping (48) is connected directly to the head (2) of the implant (1i), and thus includes a female conical hole (50) in which the conical head is housed. Said hole is suitable for the size of the head (2) of the implant (1i). The external surface of the implant impression coping has two cylindrical protuberances with rounded edges that do not allow it to be retained in the impression when it is removed from the patient's mouth. Said external surface has a beveled surface.

Figure 21A:
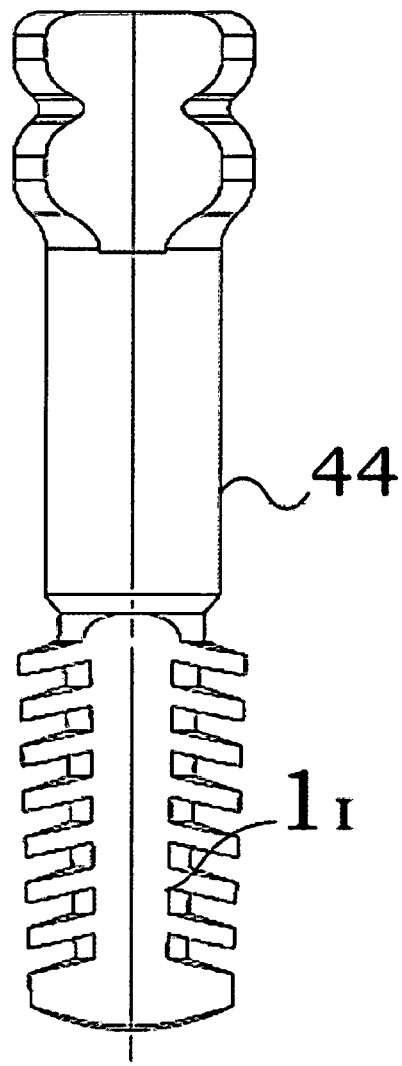
FIG. 21A shows an elevation and FIG. 21B shows a cross-sectional elevation of the closed tray implant impression coping and the screw of FIG. 19 assembled on the dental implant of FIG. 1.
Figure 21B:
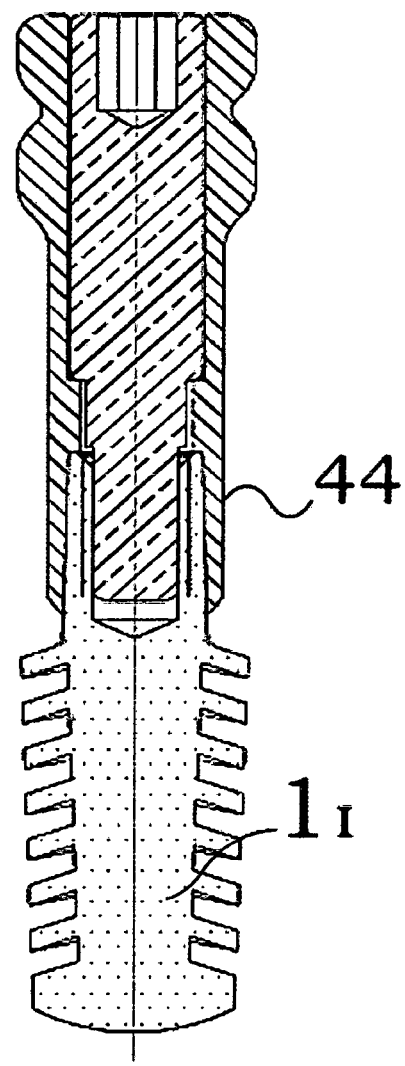

FIGS. 21A-B show the alternative implant impression coping (48) assembled on the dental implant (1i), more specifically having been connected onto the conical head (2) of the implant (1i) and having screwed the threaded area (52) of the retention screw (47) of the implant impression coping (48) to the blind threaded hole (11) of the implant (1i). The innovative characteristics of the implant (1i) in combination with the innovative characteristics of the implant impression coping (48) allow the narrow parts to work properly in practice. The alternative implant impression coping is used with a closed tray stage.

Figure 22A:
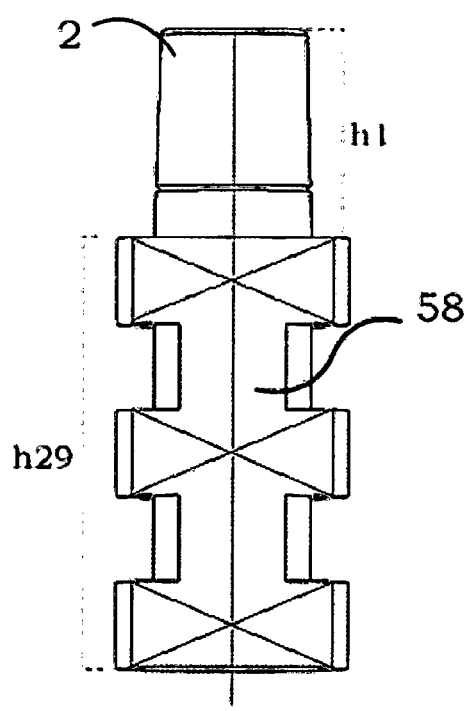
FIG. 22A shows an elevation and FIG. 22B shows a cross-sectional elevation of a laboratory analog of the unitary implant according to the proposed invention.
Figure 22B:
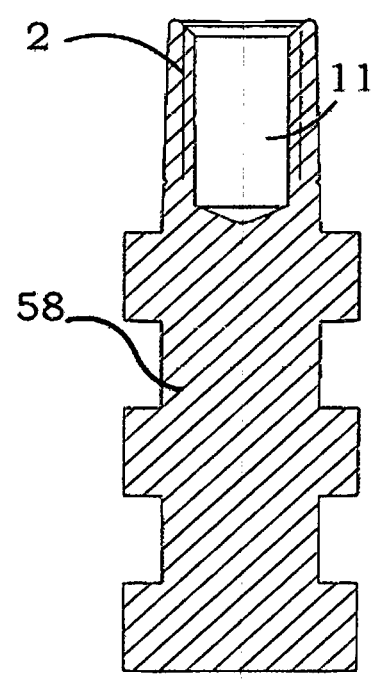

FIGS. 22A-B show a laboratory analog (58) of the unitary implant according to the proposed invention, the head of which is intended to be an exact replica of the head of the oval section implant according to the proposed invention. For this purpose, the laboratory analog's head is provided with a conical head (2) whose height (h1) is 4 mm and has a maximum diameter (d2) is 2.7 mm and a minimum diameter (d1) is 2.5 mm. Also, the head of the analog is marked at height (h3) of 0.5 mm beginning from the body, and above this marked line is the area that is used by a dental prosthesis. The upper surface of the head (2) of the analog (58) presents a blind threaded hole (11) which has a height (h2) of between 3-3.6 mm and comprises a total of between 7-9 turns of thread, said thread presenting an internal diameter (d3) of 1.6 mm and an external diameter (d4) of 2 mm.

Figure 23:
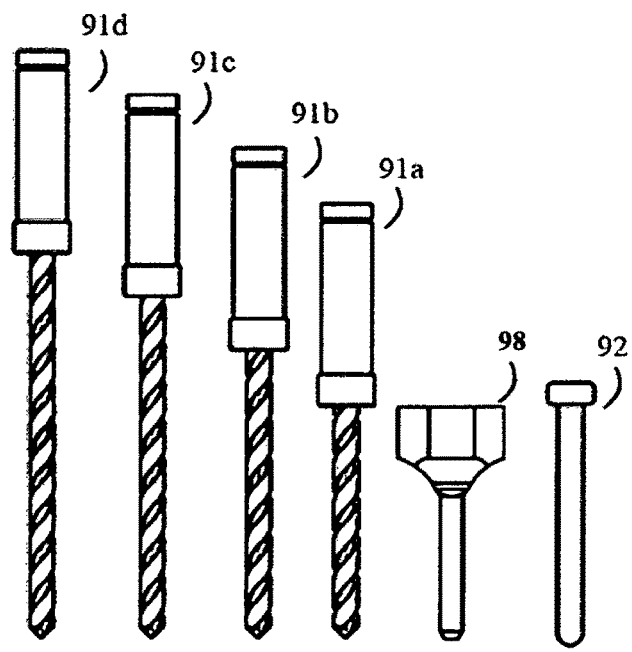
FIG. 23 shows a kit of parts comprising a surgery guide for the implant and its associated parts, according to the proposed invention.

FIG. 23 shows a set of instruments that are used to prepare the socket for the implant (1i) that has a width of 4.25 mm. This set comprises a surgery guide (98), assistant guide (92) and drill. The drill (91) has a diameter of 1.5 mm and it has four sizes of length: (91a) with 13 mm, (91b) with 15 mm, (91c) with 17 mm and (91d) with 19 mm. The height of the body of the surgery guide is 5 mm. The surgery guide (98) comprises a body and protuberance at the bottom of the body that is suitable for the hole with a diameter of 1.5 mm and will be mentioned in FIG. 25. The assistant guide (92) is a cylindrical shape with a diameter of 1.5 mm and a length of 12 mm with a cylindrical head at the top with a diameter of 3 mm and a height of 1.5 mm.

Figure 24:
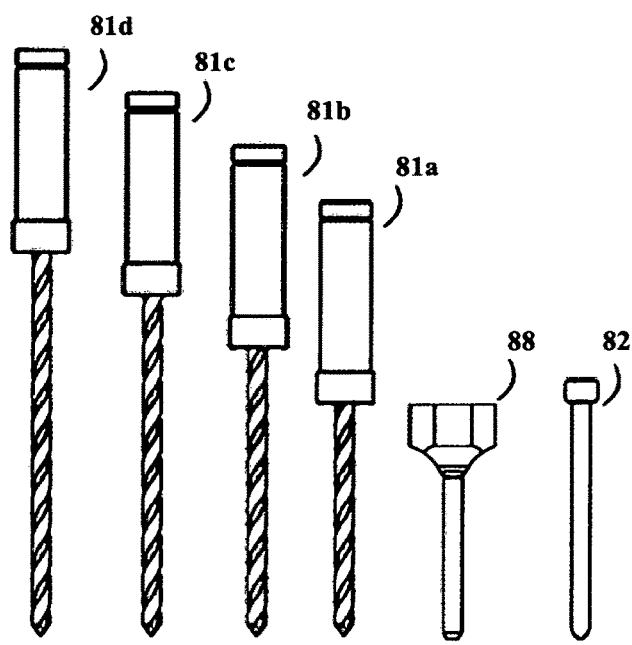
FIG. 24 shows a kit of parts comprising a surgery guide for the implant and its associated parts, according to the proposed invention.

FIG. 24 shows a set of the instruments that are used to prepare the socket of the implant (1ii). This set comprises a surgery guide (88), assistant guide (82) and drill (81). The drill (81) has a diameter of 1 mm and it has four sizes of length: (81a) with 13 mm, (81b) with 15 mm, (81c) with 17 mm and (81d) with 19 mm. The height of the body of the surgery guide is 5 mm. The surgery guide (88) comprises a body and protuberance at the bottom of the body that is suitable for the hole with a diameter of 1 mm and will be mentioned in FIG. 26. The assistant guide (82) is a cylindrical shape with a diameter of 1 mm and length of 12 mm with a cylindrical head at the top with a diameter of 2.5 mm and a height of 1.5 mm.

FIGS. 25A-D show an elevation and a cross-sectional elevation of the width of the surgery guide (98), and views of the top (94) and the bottom (95) of the surgery guide. The surgery guide comprises a body and a protuberance at the bottom. The body has an extended shape with semi-circle sides and there are two parallel symmetrical corresponding holes with a diameter of 1.5 mm and a distance (d30) of 3.75 mm between the two external edges of the cylindrical holes (96) which are clear in the lateral elevation section, upper (94) and (lower 95) view. The protuberance has a cylindrical shape with a height (h10) of 8 mm and it holds two paths on its both sides that are a result of the intersection between the two cylindrical holes with the cylindrical extension in the bottom of the body.

FIGS. 26A-D show an elevation and a cross-sectional elevation of the width of the surgery guide (88), and views of the top (84) and the bottom (85) of the surgery guide. The surgery guide comprises a body and a protuberance at the bottom. The body has an extended shape with semi-circle sides and two parallel corresponding holes with a diameter of 1 mm and a distance (d40) of 2.5 mm between the two external edges of the cylindrical holes (86) which are clear in the lateral elevation section, upper (84) and lower (85) views. The protuberance has a cylindrical shape with a height (h9) of 8 mm and has two paths on its two sides that are extensions of the holes of the body.

FIG. 27A-B show a lateral elevation view of the two shapes of the surgery guides (88 and 98). It also shows the position of the holes (86 and 96) and the path of the hole on the side of the protuberance. This position of the surgery guide shows the total diameter of the protuberance: (d14) of the surgery guide (88) of 1 mm and (d16) of the surgery guide (98) of 1.5 mm.

FIGS. 28A-E show the steps of preparing the implant socket. FIG. 28F shows a front section (90a) of the empty socket, FIG. 28Ga shows the position of the lateral protuberances of the implant with the walls of the socket. It also shows the inserting of the implant in the socket which is free at the beginning whereas the both sides of the implant will be condensed on the walls of the socket in the final position. FIG. 28F shows a lateral section (90b) of the socket and FIG. 28Gb shows the position of the implant in the lateral position with the beveled walls of the implant. The inserting of the implant in the socket is free at the beginning whereas the both sides of the implant will be condensed on the walls of the socket in the final position.

FIG. 29 shows a set of three instruments with diameter of 5 mm for pushing the implant, each instrument comprising a cylindrical part with lengths of 5 cm (100a), 7 cm (100b) and 10 cm (100c) that are used to reach difficult places. All these instruments have a functional head.

FIGS. 30A-B show the function of the head of the pushing instruments. In FIG. 30A the small protuberance having a small diameter (d22) of 0.8 mm and a height (h12) of 1 mm is suitable to work in the hexagonal hole of the locking screw. In FIG. 30B, the big protuberance having a wide diameter (d21) of 1.4 mm and a height (hl1) of 1.5 mm is suitable to work in the posterior hole of the carrier unit that has a diameter of 2.6 mm.

FIGS. 31A-B show a condensation instrument (114) for use with the implant (1i). In FIG. 31A, the condensation instrument comprises a connecting part and functional part. Said connecting part is a screw (61) with diameter of 5 mm and 5 turns of thread and there is a non-threaded area at beginning of the screw (61) whose purpose is to help insert the screw (61) in the threaded hole of the head (111) of condensation holders (see FIG. 33). The screw (61) has a height (h23) of 8.5 mm. The functional part of the instrument is a material extension and has the same section of the preparing socket of the implant (1i). At the head of the instrument there is a cylindrical part with a diameter of 1.5 mm and a length of 4 mm. When it is inserted into the prepared hole by a special drill with a diameter of 1.5 mm, it guides the condensation instrument (114a) to a correct direction in the jaw bone. This instrument is marked with lengths of 8, 10, 12 and 14 mm. In FIG. 31B the condensation instrument (114b) has the same description of the condensation instrument (115a) except the functional head doesn't have a cylindrical apex.

FIGS. 32A-B show a condensation instrument (115) for the implant (1ii). In FIG. 32A, the condensation instrument comprises a connecting part and functional part.

Said connection part is a screw (61) with diameter of 5 mm and 5 turns of thread and there is a non-threaded area at beginning of the screw (61), whose purpose is to help insert the screw (61) into the threaded hole of the head (111) of the condensation holders. The screw (61) has a height (h23) of 8.5 mm. The functional part of the instrument is a material extension and it has the same section of the preparing socket of the implant (1ii). In the head of the instrument there is a cylindrical part with a diameter of 1 mm and a length of 4 mm. When it is inserted into the prepared hole by a special drill with a diameter of 1 mm, it guides the condensation instrument (115a) to a correct direction in the jaw bone. This instrument is marked with lengths of 8, 10, 12 and 14 mm. In FIG. 32B the condensation instrument (115b) has the same description of the condensation instrument (115a) except the functional head doesn't have a cylindrical apex.

FIG. 33 shows a set of holders for the condensation instruments which have a hexagonal section with a diameter of 7 mm between the parallel faces. The head (111) that holds the condensation instrument has a rounded section with a diameter of 7 mm and a length of 7 mm, and there is a threaded hole inside it with a depth of 9 mm. The threaded hole has an external diameter of between 4.7 and 4.8 mm and internal diameter of between 4.5 and 4.6 mm. These holders have three lengths of 5 cm (110a), 7 cm (110b) and 10 cm (110c) and are used to reach difficult places. All these instruments have a functional head.

FIG. 34 shows a cross-sectional elevation of the condensation instrument (114a) assembled on the holder (110).

Figure 35:
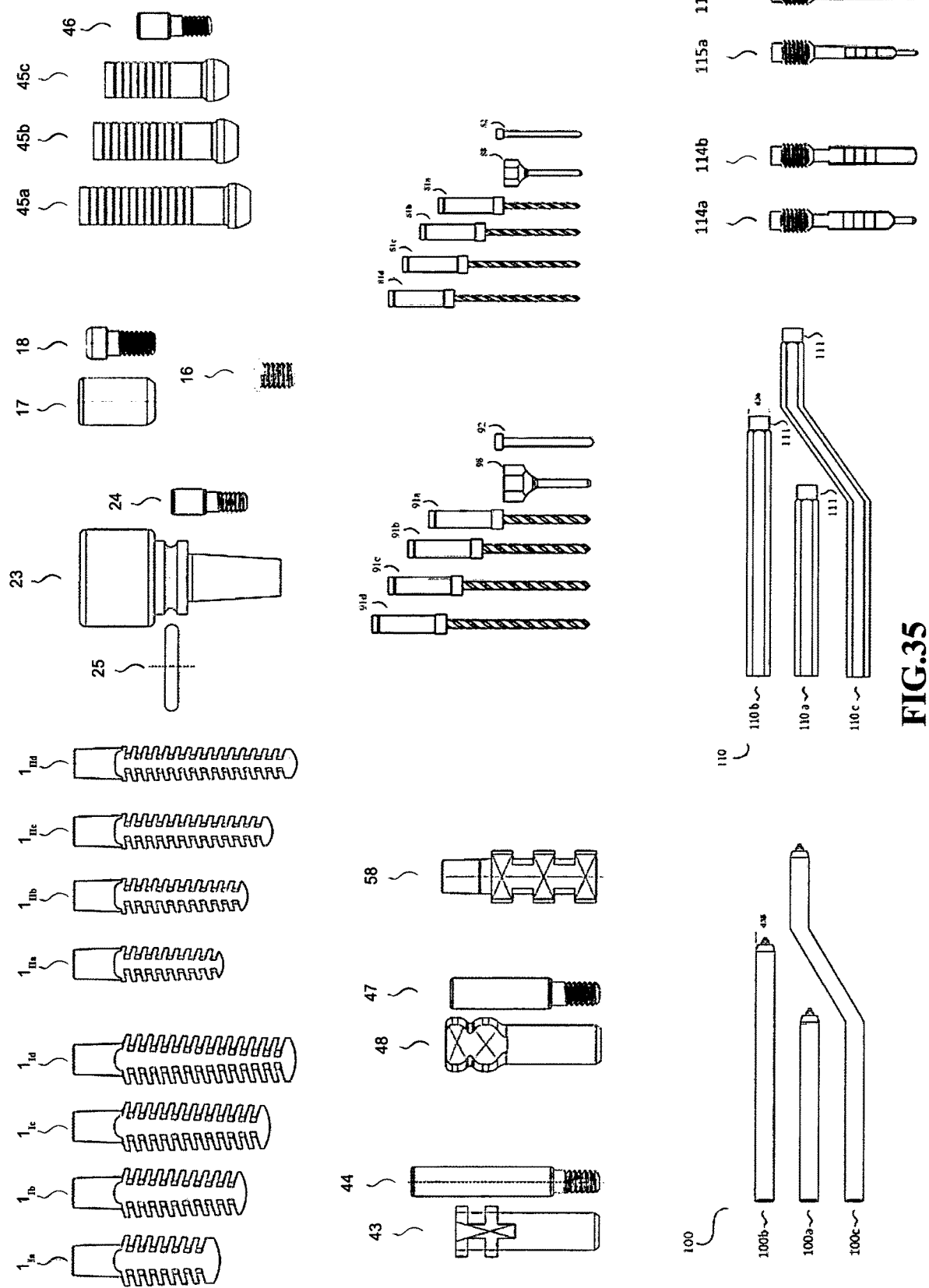
FIG. 35 shows an example of set of parts or kit that makes up the dental implant and the associated parts according to the invention.

FIG. 35 shows a possible kit of various dental implants and associated parts according to the proposed invention. It can be seen that the kit includes the parts described in the figures above including various-sized embodiments of dental implants (1la, 1lb, 1lc and $1_{ld}$) and of the implants (IIa, IIb, IIc and IId), healing abutments (17 and 18), implant impression coping for use with an open tray (43 and 44), implant impression coping for use with a closed tray (47 and 48), analog (58), the set of the instruments that are used to prepare the socket of the implant (1l) (91a, 91b, 91c, 91d, 98 and 92) and the set of the instruments that are used to prepare the socket of the implant (1ii) (81a, 81b, 81c, 81d, 88 and 82), pushing instruments (100a, 100b and 100c), holders for condensation instruments (110a, 10b and 110c) and condensation instruments (114a,114b, 115a and 115b).

The invention claimed is:
1. A dental implant comprising;
   a head for connecting with a prosthesis, and a body adapted to be inserted into an alveolar bone;
   wherein the head has a conical outer surface and has a threaded hole completely contained therein;
   wherein the body forms an approximately oval shaped cross section defining two opposed semi-circular sides and two opposed flat sides there between, the body comprising a central conical part extending from the head to a distal end including a curved apex, the central conical part having two opposed beveled surfaces forming the opposed flat sides of the cross section; the body further comprising two opposed rows of a plurality of protuberances extending from the central conical part only on surfaces other than the two opposed beveled surfaces; each protuberance of the two opposed rows being separated from an adjacent protuberance by a space along a height of the implant; each protuberance of the two opposed rows having semi-circular free ends angled downward, forming the opposed semi-circular sides of the cross section; the rows of opposed protuberances thereby being arranged between the opposed beveled surfaces; and two opposed curved surfaces extending from the two opposed beveled surfaces of the central conical part of the body onto and transitioning into the conical outer surface of the head.

2. The dental implant according to claim 1, wherein the threaded hole of the head has a depth of 3.5 mm and comprises 9 total turns of thread.

3. The dental implant according to claim 2, wherein the threaded hole of the head has an internal diameter of 1.7 mm and an external diameter of 2 mm.

4. The dental implant according to claim 1, wherein the maximum thickness of the body is 2 mm.

5. The dental implant according to claim 1, wherein the protuberances have parallel upper and lower surfaces and uniform thickness.

6. The dental implant according claim 1, wherein the implant has a length of 8, 10, 12 or 14 mm.

7. A kit comprising;
the dental implant of claim 1;
one or more of an implant carrier, a final abutment, a healing abutment, a locking screw, an impression coping, and/or a laboratory analog; and
a surgical guide, an assistant surgical guide, drills, a placement instrument and a condensation instrument.

* * * * *